(12) United States Patent
Hotelling et al.

(10) Patent No.: US 9,921,696 B2
(45) Date of Patent: Mar. 20, 2018

(54) SENSOR WITH DIFFUSING RESISTOR

(71) Applicant: Apple Inc., Cupertino, CA (US)

(72) Inventors: Steven P. Hotelling, Los Gatos, CA (US); Vivek Pant, San Jose, CA (US); Prathit Bugnait, Sunnyvale, CA (US); Isaac Chan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 14/866,846

(22) Filed: Sep. 26, 2015

(65) Prior Publication Data

US 2016/0313825 A1    Oct. 27, 2016

Related U.S. Application Data

(60) Provisional application No. 62/152,794, filed on Apr. 24, 2015, provisional application No. 62/189,611, filed on Jul. 7, 2015.

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01); *G06F 2203/04103* (2013.01)

(58) Field of Classification Search
CPC .................. G06F 3/044; G06F 3/0418; G06F 2203/04103; H03K 17/9622
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Richard Hong
(74) *Attorney, Agent, or Firm* — Morrison & Foerster LLP

(57) ABSTRACT

Electrode configurations for reducing wobble error for a stylus translating on a surface over and between electrodes of a touch sensor panel is disclosed. In some examples, electrodes associated with a more linear signal profile are correlated with lower wobble error. In some examples, electrodes are coupled to adjacent electrodes via diffusing resistors such that the signal profile for each electrode is spread to be more linear. In some configurations, the value of the diffusing resistors and series resistance associated with an electrode is selected based on a desired signal profile for that electrode. In some examples, the series resistance can include a trace resistance and a compensating resistance. The compensating resistance can compensate for a variance in trace resistance between electrodes, thus making series resistance substantially equal for each of the electrodes.

25 Claims, 14 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0197753 A1 | 9/2006 | Hotelling |
| 2009/0303189 A1* | 12/2009 | Grunthaner ............ G06F 3/044 345/173 |
| 2011/0210934 A1 | 9/2011 | Lee et al. |
| 2011/0279400 A1* | 11/2011 | Yilmaz ................ G06F 3/0416 345/174 |
| 2012/0127387 A1* | 5/2012 | Yamato .................. G06F 3/044 349/42 |
| 2014/0125403 A1* | 5/2014 | Yilmaz ............. H03K 17/9622 327/517 |
| 2014/0210768 A1* | 7/2014 | Badaye .................. G06F 3/044 345/174 |
| 2015/0002752 A1* | 1/2015 | Shepelev ................ G06F 3/044 349/12 |
| 2015/0009174 A1 | 1/2015 | Huang et al. |
| 2015/0091820 A1 | 4/2015 | Rosenberg et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," a Dissertation Submitted to the Faculty of the University of Delaware in Partial Fulfillment of the Requirements for the Degree of Doctor of Philosophy in Electrical Engineering, 364 pages.

* cited by examiner

TO TOUCH CIRCUITRY

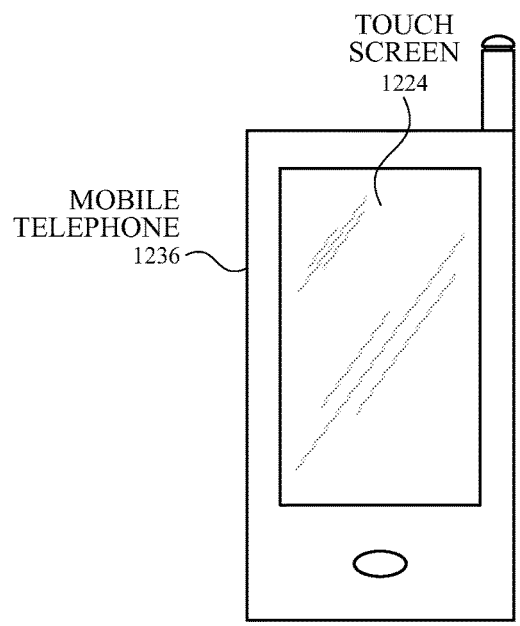
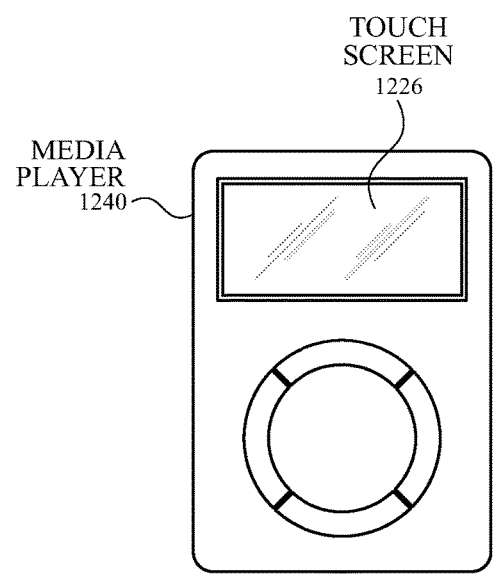
*FIG. 12A*  *FIG. 12B*
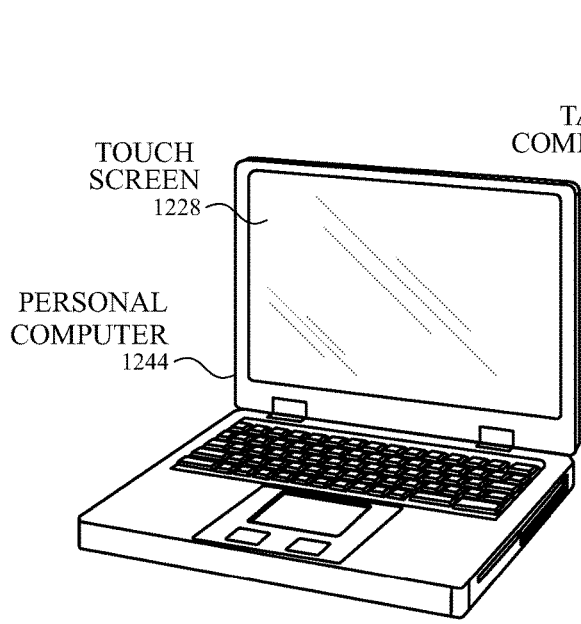
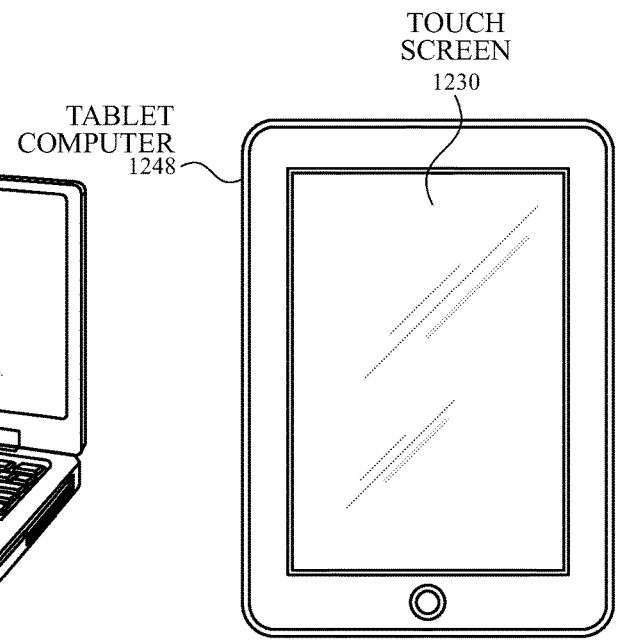
*FIG. 12C*  *FIG. 12D*

SENSOR WITH DIFFUSING RESISTOR

CROSS-REFERENCE TO RELATED APPLICATIONS

This application claims the benefit of U.S. Provisional Application No. 62/152,794, filed Apr. 24, 2015, and U.S. Provisional Application No. 62/189,611, filed Jul. 7, 2015, which are incorporated by reference in their entireties for all purposes.

FIELD OF DISCLOSURE

This relates generally to touch sensing, and more particularly, to improving position calculation for objects touching a touch sensor panel.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. The effectiveness of a stylus, however, can depend on the ability to accurately calculate the position of the stylus on a touch sensor panel.

SUMMARY OF THE DISCLOSURE

A stylus can be used as an input device for some capacitive touch panels. In some examples, the touch sensor panel can have errors in position detection, referred to herein as wobble error, when a stylus is positioned between two of a plurality of sense electrodes. In some cases, wobble error can correlate to the signal profile associated with electrodes within the touch sensor panel. Specifically, signal profiles which are narrower (i.e., less linear) can correlate to higher wobble error, while signal profiles which are widened within a range (i.e., to be more linear) can correlate to lower wobble error. Accordingly, in some examples, sense electrodes can be configured such that the signal profile associated with each sense electrode is spread to be wider, and thus, more linear. In some configurations, adjacent sense electrodes can be coupled together via diffusing resistors, which can be configured to diffuse a portion of a received signal to adjacent electrodes. In some examples, the value of the diffusing resistors coupling adjacent electrodes can be selected based on a desired signal profile for each adjacent electrode. In some examples, the value of the diffusing resistors coupling adjacent electrodes can be selected based on series resistances associated with each adjacent electrode. In some examples, series resistance can include a conductive trace resistance and a compensating resistance. In some examples, compensating resistances can be selected to compensate for variances between electrodes, for example, variances in conductive trace resistance or diffusing resistance. In some examples, compensating resistances can be selected such that series resistances associated with each electrode can be substantially equal.

BRIEF DESCRIPTION OF THE DRAWINGS

FIGS. 12A-12D illustrate example systems that can implement the signal-diffusing configurations for reducing stylus tip wobble according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

A stylus can be used as an input device for some capacitive touch sensor panels. In some examples, the touch sensor panel can have errors in position detection, referred to herein as wobble error, when a stylus is positioned between two of a plurality of sense electrodes. In some cases, wobble error can correlate to the signal profile between the stylus and electrodes within the touch sensor panel. Specifically, signal profiles which are narrower (i.e., less linear) can correlate to higher wobble error, while signal profiles which are widened within a range (i.e., to be more linear) can correlate to lower wobble error. Accordingly, in some examples, sense electrodes can be configured such that the signal profile associated with each sense electrode is spread to be wider, and thus, more linear. In some configurations, adjacent sense electrodes can be coupled together via diffusing resistors, which can be configured to diffuse a portion of a received signal to adjacent electrodes. In some examples, the value of the diffusing resistors coupling adjacent electrodes can be selected based on a desired signal profile between the stylus and each adjacent electrode. In some examples, the value of the diffusing resistors coupling adjacent electrodes can be selected based on series resistances associated with each adjacent electrode. In some examples, series resistance can include a conductive trace resistance and a compensating resistance. In some examples, compensating resistances can be selected to compensate for variances between electrodes, for example, variances in conductive trace resistance or diffusing resistance. In some examples, compensating resistances can be selected such that series resistances associated with each electrode are substantially equal. It should be understood that although examples of the disclosure are discussed herein primarily in terms of a stylus, the examples of the disclosure are not so limited, but include other small objects, including small fingers, that can cause wobble error similar to a stylus.

Figure 1:
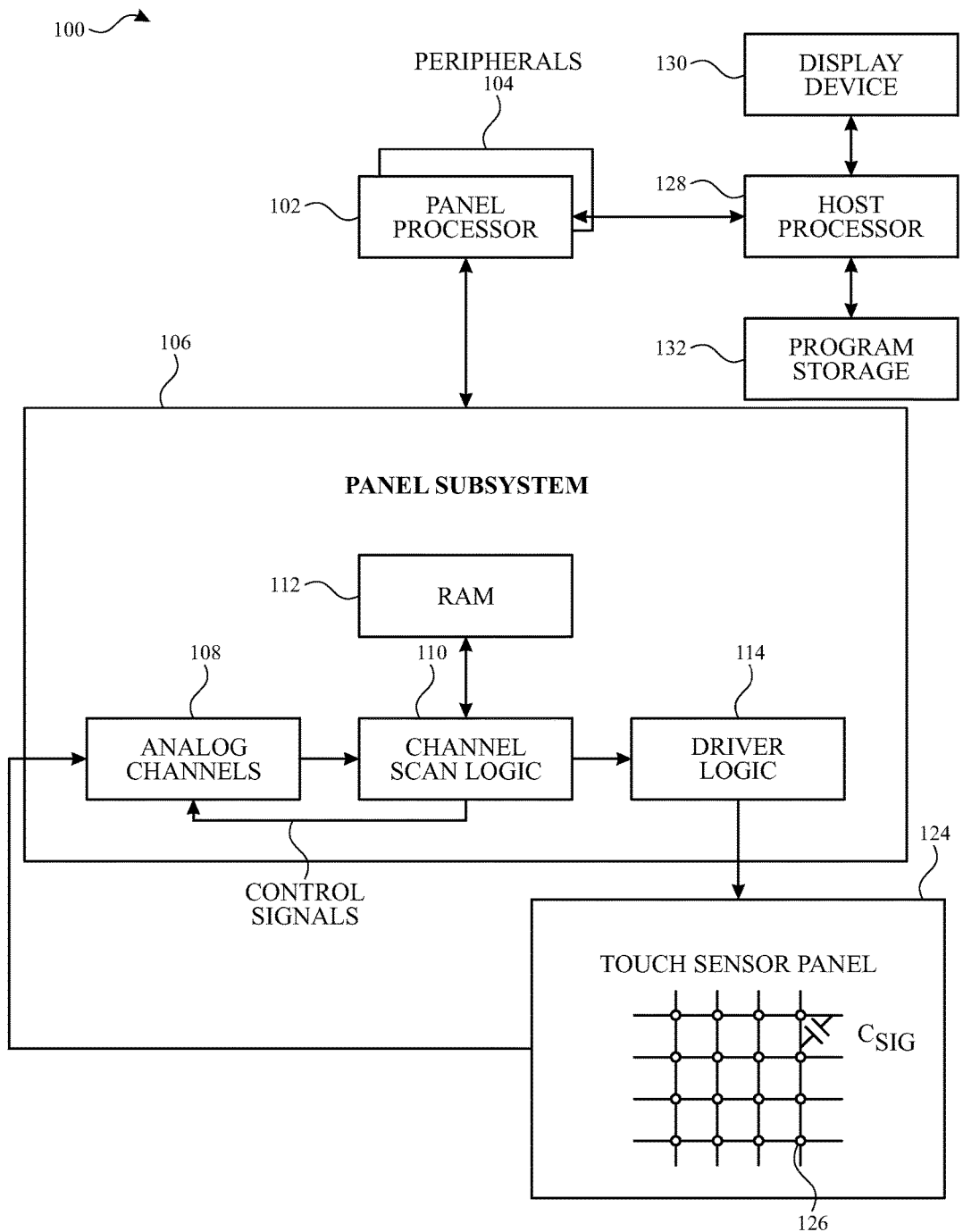
FIG. 1 illustrates an exemplary computing system capable of reducing stylus tip wobble according to examples of the disclosure.

FIG. 1 illustrates an exemplary computing system capable of reducing wobble according to examples of the disclosure. Computing system 100 can include one or more panel processors 102, peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. In mutual capacitance touch sensor panel examples, the panel can be driven and sensed using separate drive and sense lines, as shown in FIG. 1. However, in self capacitance touch sensor panel examples, the sense electrodes can be driven and sensed using the lines. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to touch sensor panel 124. In some examples, panel subsystem 106, panel processor 102 and peripherals 104 can be integrated into a single application specific integrated circuit (ASIC).

In mutual capacitance sensing examples, touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel).) The capacitance between the drive and sense lines and local system ground can appear as a stray capacitance Cstray, and the capacitance at the intersections of the drive and sense lines, i.e., the touch nodes, can appear as a mutual signal capacitance Csig between the drive and sense lines when the given drive line is stimulated with an alternating current (AC) signal. The presence of a finger or other object (such as a stylus) near or on the touch sensor panel can be detected by measuring changes to a signal charge present at the nodes being touched, which can be a function of Csig. Each sense line of touch sensor panel 124 can be coupled to a sense channel 108 in panel subsystem 106. Touch sensor panel 124 can cover a portion or substantially all of a surface of a device.

In self capacitance sensing examples, touch sensor panel 124 can include a capacitive sensing medium having a plurality of sense electrodes. The sense electrodes can be formed from a transparent conductive medium such as ITO or ATO, although other transparent and non-transparent materials such as copper can also be used. The sense electrodes can be formed on a single side of a substantially transparent substrate, on opposite sides of the substrate, or on two separate substrates separated by dielectric material. In some examples, the sense electrodes can be viewed as picture element (pixel) 126, which can be particularly useful when touch sensor panel 124 is viewed as capturing an "image" of touch. In other examples, the sense electrodes can be configured as elongated sense rows and/or sense columns. The capacitance between the sense electrodes and system ground can represent the self capacitance of those electrodes. The presence of a finger or other object (such as a stylus) near or on the touch sensor panel can be detected by measuring changes to the self capacitance of nearby sense electrodes. Each sense electrode of touch sensor panel 124 can be coupled to a sense channel 108 in panel subsystem 106. Touch sensor panel 124 can cover a portion or substantially all of a surface of a device In some examples, computing system 100 can also include a stylus as an input device. In some examples, the stylus can actively capacitively couple with the drive and/or sense lines of touch sensor panel 124 by, for example, transducing a signal from the stylus to the drive and/or sense lines. In some examples, the stylus can act as a passive input device in a mutual capacitance system, as described above. In some examples, the touch sensor panel 124 includes a conductive sensing media having a plurality of sense rows and a plurality of sense columns, or a plurality of sense electrodes. In these examples, a stylus can capacitively couple with the sense rows, sense columns, or sense electrodes.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form a touch screen.

In some examples, touch sensor panel 124 and display device 130 together can form an integrated touch screen in which touch sensing circuit elements of the touch sensing system (e.g., sense electrodes) can be integrated into the display pixel stackups of display device 130. The circuit elements in an integrated touch screen can include, for example, elements that can exist in LCD or other displays, such as one or more pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as elements of the touch circuitry of the touch sensing system. Specifically, each common electrode can operate as a common electrode of the display circuitry of the touch screen (e.g., during a display phase), and can also operate as a common electrode (i.e., a sense electrode) of the touch circuitry of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch sensing circuit elements may be either a multi-function circuit element that can form part of the touch circuitry and can perform one or more other functions, such as forming part of the display circuitry, or may be a single-function circuit element that can operate as touch circuitry only. Similarly, each of the display circuit elements may be either a multi-function circuit element that can operate as display circuitry and perform one or more other functions, such as operating as touch circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

Note that one or more of the functions described above can be performed by firmware stored in memory (e.g., one of the peripherals 104 in FIG. 1) and executed by panel processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
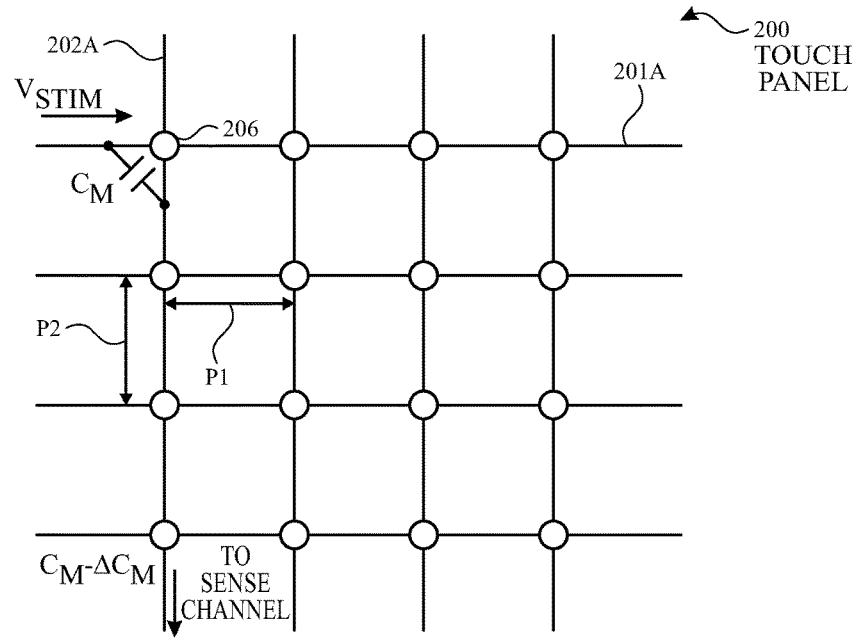
FIGS. 2A and 2B illustrate an exemplary mutual capacitance touch sensor panel that can be used to detect touch or hover (proximity) events according to examples of the disclosure.

FIG. 2A symbolically illustrates an exemplary mutual capacitance touch sensor panel that can be used to detect touch or hover (proximity) events according to examples of the disclosure. In some mutual capacitance examples, touch sensor panel 200 can include an array of touch nodes 206 formed at the crossing points of row electrodes (e.g., drive lines) 201a and column electrodes (e.g., sense lines) 202a, although as discussed above, it should be understood that other drive and sense configurations can be used. A stylus can include an electrode configured to alter the capacitive coupling between a crossing row electrode and column electrode. Each of the column electrodes 202 can output its capacitance readings to one or more touch sensing circuits, which can be used to detect a touch or hover event.

The distance between each adjacent touch node in the same row can be a fixed distance, which can be referred to as the pitch P1 for column electrodes. The distance between each adjacent touch node in the same column can be a fixed distance, which can be referred to as the pitch P2 for row electrodes. In some examples, the pitch for row electrodes and column electrodes can be the same, but in other examples, P1 and P2 can be different.

During a mutual capacitance scan, one or more drive rows 201a can be stimulated to drive the touch sensor panel 200. Touch nodes 206 can have a mutual capacitance Cm at the touch nodes 206 when there is no object touching or hovering over touch nodes 206. When an object touches or hovers over the touch node 206 (e.g. a stylus), the mutual capacitance Cm can be reduced by ΔCm, i.e., (Cm−ΔCm), corresponding to the amount of charge shunted through the object to ground. This mutual capacitance change can used to detect a touch or hover event and its location.

Figure 2B:
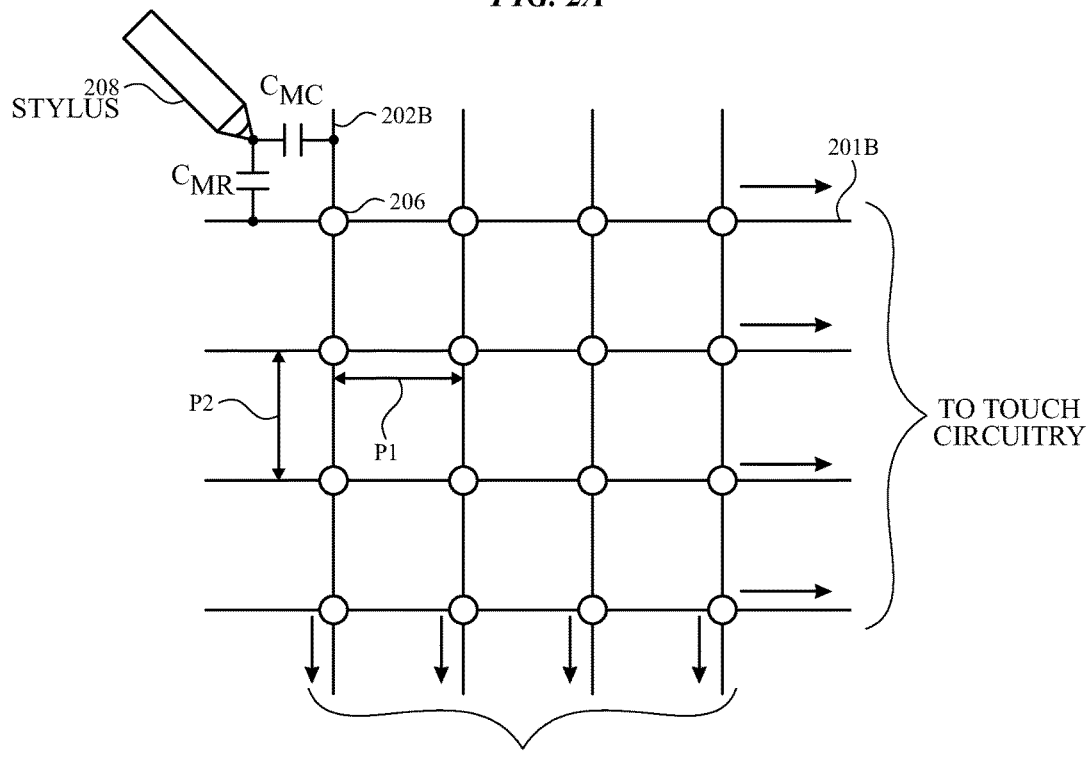

FIG. 2B symbolically illustrates an exemplary mutual capacitance touch sensor panel operable with an active stylus according to examples of the disclosure. In some mutual capacitance examples, an active stylus can generate stimulation signals (effectively operating as a drive electrode), and column electrodes 202b and row electrodes 201b can effectively operate as sense electrodes. During a stylus scan, one or more stimulation signals can be injected by stylus 208 into the touch sensor panel and can cause mutual capacitive coupling Cmr between the stylus 208 and the row traces 201b and capacitive coupling Cmc between the stylus 208 and the column traces 202b. The capacitance Cmr and Cmc can be transmitted to one or more touch sensing circuits for processing. In some examples, row traces 201b and column traces 202b can correspond to row electrodes 201a and sense columns 202a, however, during the stylus scan, stimulation signals are not applied to row electrodes 201 apart from signals generated by the active stylus. Additionally, in some examples, the touch sensor panel can include a stylus scan, a row scan, and a column scan, which can each operate as set forth above.

In some self capacitance examples, touch sensor panel 200 can include a plurality of sense electrodes (touch nodes). In some examples, the sense electrodes can be configured as elongated sense rows 201 and/or sense columns 202. In other examples each sense electrode can be electrically isolated from the other sense electrodes and configured to represent a particular x-y location (e.g. touch node 206) on the panel. Such a touch screen can be referred to as a pixelated self-capacitance touch screen. A stylus can include an electrode configured to capacitively couple to a sense electrode. Each of the sense electrodes can output its capacitance readings to one or more touch sensing circuits, which can be used to detect a touch or hover event.

In some cases, an object, such as a stylus, may touch or hover at a position not directly over a touch node 206, but in between two touch nodes 206. For example, a stylus may touch or hover at a position between two row electrodes 201, between two column electrodes 202, or both. In these examples, the signal sensed at a plurality of touch nodes 206 may be used to estimate the location of the touch or hover event. In some examples, a centroid estimation algorithm can calculate the location of the touch or hover event using the signal sensed at the plurality of touch nodes 206. For example, the position of a stylus on a touch sensor panel along an x-axis can be calculated by computing a weighted centroid defined in equation (1):

$$x_{calc} = \frac{\sum_{i=-N}^{N} x_i S_i}{\sum_{i=-N}^{N} S_i} \quad (1)$$

where $x_{calc}$ can be the calculated position along the x-axis, $S_i$ can be the signal measured at the $i^{th}$ electrode, such as a sense electrode, along the x-axis, and $x_i$ can be the position of the $i^{th}$ electrode along the x-axis. It is to be understood that the centroid estimation algorithm defined in equation (1) is given only as an example, and the configurations described herein need not be limited to such examples. Instead, the calculation of a touch or hover location of an object can be accomplished using any appropriate method.

Ideally, as an object such as a stylus traverses between two touch nodes, the calculated position of the stylus on the touch screen and the actual position of the stylus should be the same. In reality, the calculated position may be different from the actual position due to limitations in the circuit configuration and the position estimation algorithms used. Errors resulting from the disparity between calculated position and actual position as an object moves along a touch sensor panel can be referred to as wobble error.

Figure 3A:
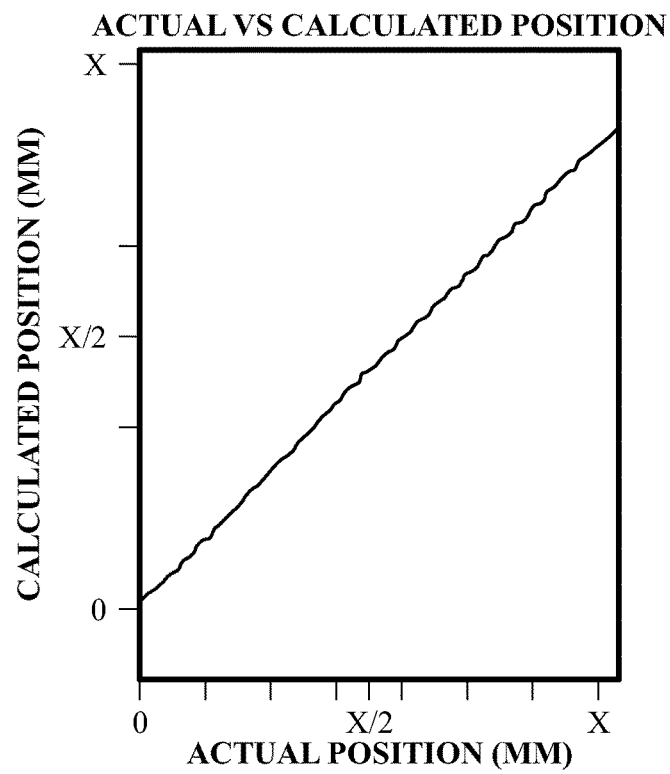
FIGS. 3A and 3B illustrate examples of the disparity between actual position and calculated position as a stylus moves along one axis of a touch sensor panel according to examples of the disclosure.
Figure 3B:
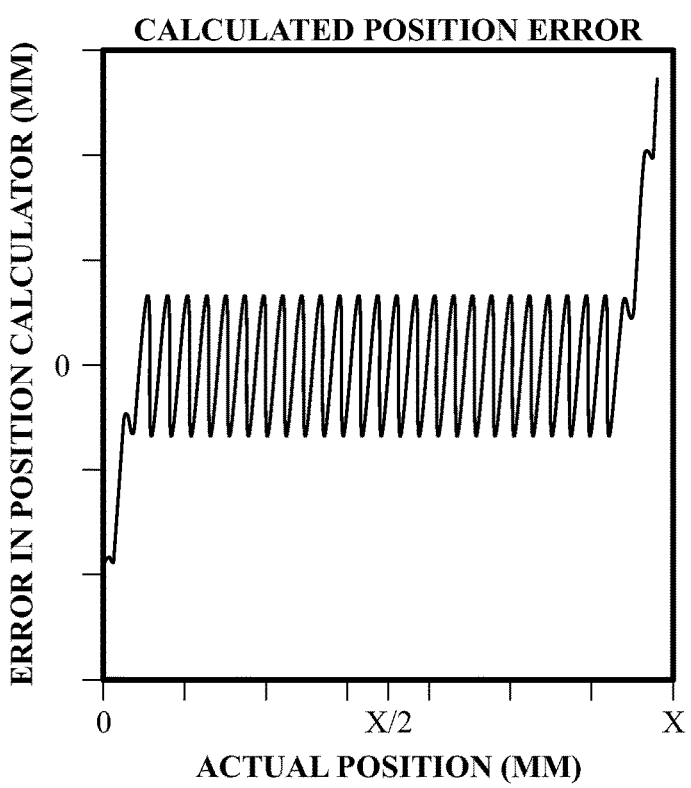

It can be useful to consider wobble error in the context of a stylus moving along a single axis of a touch sensor panel without diffusing resistors. This concept is illustrated by example in FIGS. 3A and 3B. FIGS. 3A and 3B illustrate examples of the disparity between actual position and calculated position as an object, such as a stylus, moves along an x-axis of a customary touch sensor panel (e.g., a touch panel without diffusing resistors) according to examples of the disclosure. FIG. 3A illustrates a plot of the calculated position of the stylus versus the actual position of the stylus when calculating position by using a weighted centroid algorithm including a subset of the electrodes (e.g., five electrodes) along an x-axis. In an ideal case, where calculated position and actual position are the same, the plot can be a straight line at a 45 degree angle. However, because of non-idealities in the coupling between the stylus and the touch sensor panel and the algorithm used to calculate stylus position, there can be non-ideal results that can appear as a wobble in the plot of FIG. 3A as the stylus moves between electrodes along the x-axis. In other words, the signal coupling between the stylus and touch sensor panel and the calculated position metric can introduce an error in calculated position (discrepancy with actual position) that can cause a wobble to be displayed when plotting the actual versus calculated position.

FIG. 3B illustrates a plot of the error in position calculation versus the actual position when calculating position by taking a weighted centroid including a subset of the electrodes (e.g., five electrodes) along an x-axis. The oscillation of the error plot can be representative of the wobble due to remaining error in the position calculation in a customary touch panel (e.g., a touch panel without diffusing resistors).

It should be noted that the scope of this disclosure can extend beyond the context of an active stylus coupling to sense electrodes, however, the examples of this disclosure focus on a stylus-sense electrode configuration for ease of description. FIGS. 3A and 3B relate to calculating position using a subset of the electrodes, however, it should be understood that the position could be calculated using any number of electrodes, including all of the electrodes in a touch sensor panel. Moreover, although FIGS. 3A and 3B are described with reference to the x-axis, in some examples, similar effects can be observed when moving the stylus across the touch sensor panel along the y-axis.

Figure 4A:
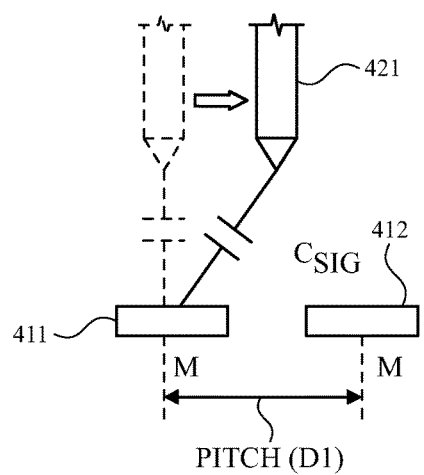
FIGS. 4A and 4B illustrate example signal profiles as a stylus moves along an axis of a touch sensor panel according to examples of the disclosure.
Figure 4B:
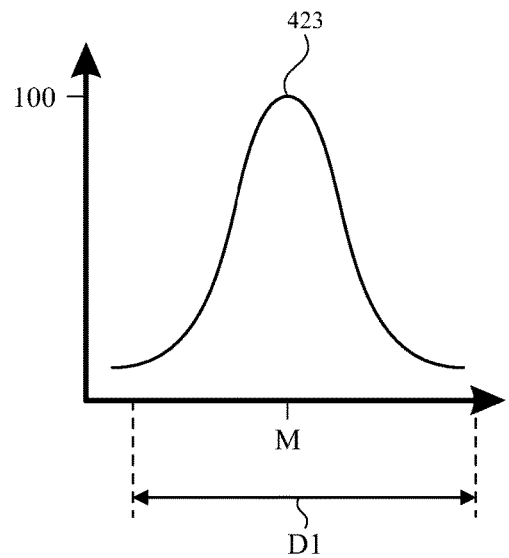

It can be useful to discuss the characteristics of the electrode configuration of a touch sensor panel in terms of the signal profile between a stylus and an electrode. This concept is explained by example with reference to FIGS. 4A and 4B. FIGS. 4A and 4B relate to an example signal profile in an x-axis of an example electrode 411 having a pitch with a distance D1 as shown. As shown in FIG. 4A, an object, such as a stylus 421, can be at a distance above an electrode 411 and moved in an x-direction across electrode 411. At each point along the x-axis, a signal coupling Csig exists between the stylus and the electrode, which varies as the stylus moves from the midpoint M of electrode 411. FIG. 4B illustrates a plot of an example signal profile, which can correlate to the signal Csig sensed on electrode 411 from stylus 421 as the stylus is moved in the x-direction. In some examples, such as when the stylus 421 is an active stylus, the signal Csig may represent a signal transduced by the stylus on the electrode. In some examples, the signal Csig may correspond to a self-capacitance of an object detected by the electrode or a change in mutual capacitance between a drive electrode and sense electrode. The x-axis of the plot in FIG. 4B can correlate to the position of the stylus in the x-axis relative to a midpoint M of an electrode 411, and the y-axis of the plot in FIG. 4B can correlate to a normalized signal measurement at each x-position along the x-axis. The midpoint M of the x-axis of the plot in FIG. 4B can correspond to the midpoint M of electrode 411 shown in FIG. 4A. As shown in FIGS. 4A and 4B, the signal level can have a maximum value 423 when the stylus is at the midpoint of electrode 411, and the signal level can decrease as the stylus traverses the x-axis away from the midpoint. In some examples, the signal profile can be non-linear. As discussed in more detail below, the signal profile between a stylus and an electrode can vary greatly based on a variety of factors including, for example, the circuit configuration of the electrodes.

Figure 5A:
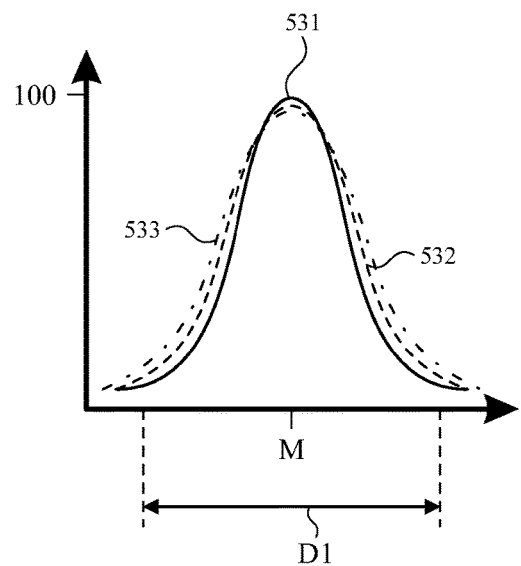
FIGS. 5A and 5B illustrate various signal profiles corresponding to various electrode configurations and levels of wobble error correlating with the signal profiles according to examples of the disclosure.
Figure 5B:
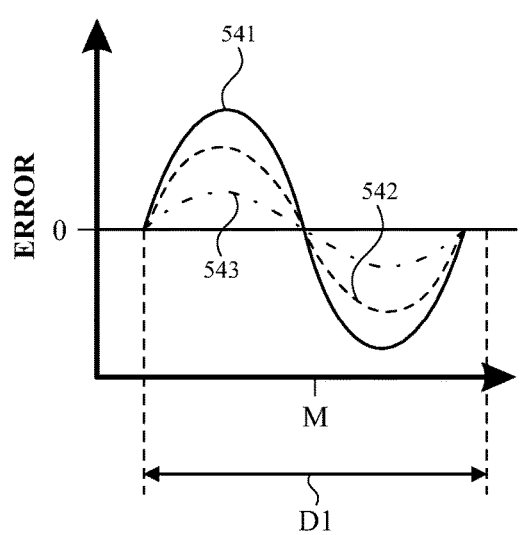

In some examples, the wobble error of a touch sensor panel can correlate with the signal profile between a stylus and electrodes formed on the touch sensor panel. FIGS. 5A and 5B illustrate the correlation between three different example signal profiles 531-533 and the wobble error 541-543 associated with each of the example signal profiles. FIG. 5A illustrates plots of three example signal profiles 531, 532 and 533. As described above with reference to FIGS. 4A and 4B, each signal profile can represent a signal Csig sensed on an electrode 411 from a stylus 421 as the stylus is moved in an x-direction. Each of the signal profiles 531, 532 and 533 in FIG. 5A can correspond to three hypothetical electrode configurations (not shown) A, B and C, each indicated by a different line pattern. Electrode configurations A-C can differ, for example, in electrode shape or circuit configuration.

FIG. 5B illustrates three example plots of the error in position calculation versus the actual position (i.e., wobble error) when calculating position of a stylus by taking a weighted centroid including a set of electrodes along an x-axis, with each error plot 541, 542 and 543 corresponding to a set of electrodes with electrode configurations A, B, and C, respectively. FIG. 5B is similar to the plot of FIG. 3B, however, unlike the plot in FIG. 3B, which has an x-axis spanning the length of the touch sensor panel, the x-axis of FIG. 5B spans only the distance D1 (e.g., the distance of the pitch) immediately surrounding a single electrode as shown. In some examples, the single oscillation in the error plots 541, 542 and 543 shown in FIG. 5B can be similar to one of the many oscillations shown in FIG. 3B. For clarity, each of the example electrode configurations A-C in FIGS. 5A and 5B are assumed to have an equal pitch and midpoint.

In some examples, if a signal profile is very non-linear, position estimation algorithms, such as that listed in equation (1), can produce higher wobble error when a stylus is positioned between touch nodes. In the example of FIGS. 5A and 5B, an electrode configuration A can correspond to signal profile 531 and wobble error plot 541. As shown in FIG. 5A, the shape of signal profile 531 corresponding to electrode configuration A is the least "spread" of signal profiles 531-533. In other words, signal profile 531 is the least linear signal profile as a stylus is moved away from the peak. As shown in FIG. 5B, error plot 541 corresponding to electrode configuration A has the most wobble error of the error plots 541-543. FIG. 5A also illustrates that the shape of signal profile 532 corresponding to electrode configuration B is more linear than signal profile 531. As shown in FIG. 5B, error plot 542 corresponding to electrode configuration B has less wobble error than error plot 541 corresponding to electrode configuration A. FIG. 5A further illustrates that the shape of signal profile 533 corresponding to electrode configuration C is the most linear of signal profiles 531-533, and its corresponding error plot 543 in FIG. 5B has the least wobble error of error plots 544-543. Thus, as illustrated in these examples, electrode configurations with more linear signal profiles are correlated with lower wobble error.

The configurations and plots represented in FIGS. 5A and 5B are presented only as examples of how a more linear signal profile can be correlated with lower wobble error, and should not be understood to represent specific values or scale. It should be understood that wobble error of a touch sensor panel can be determined by other factors in addition to configuration of the electrodes in the touch sensor panel, such as, for example, position calculation algorithms used, stylus shape, and electrode pitch. Moreover, the solutions discussed in this disclosure can apply to configurations different from those discussed with respect to FIGS. 5A and 5B, including configurations of mutual capacitance, self-capacitance, and configurations wherein the touch object is not a stylus.

As discussed above, electrodes having a more linear signal profile can correlate to a lower wobble error. Therefore, it can be beneficial to configure each electrode in a touch sensor panel to have a more linear signal profile, by, for example, spreading the signal profile associated with each electrode outwardly toward adjacent electrodes. Thus, in some examples, it can be beneficial to couple adjacent electrodes together in signal-diffusing configurations using diffusing resistors. These signal-diffusing configurations will now be discussed below with reference to FIGS. 6-12.

Figure 6:
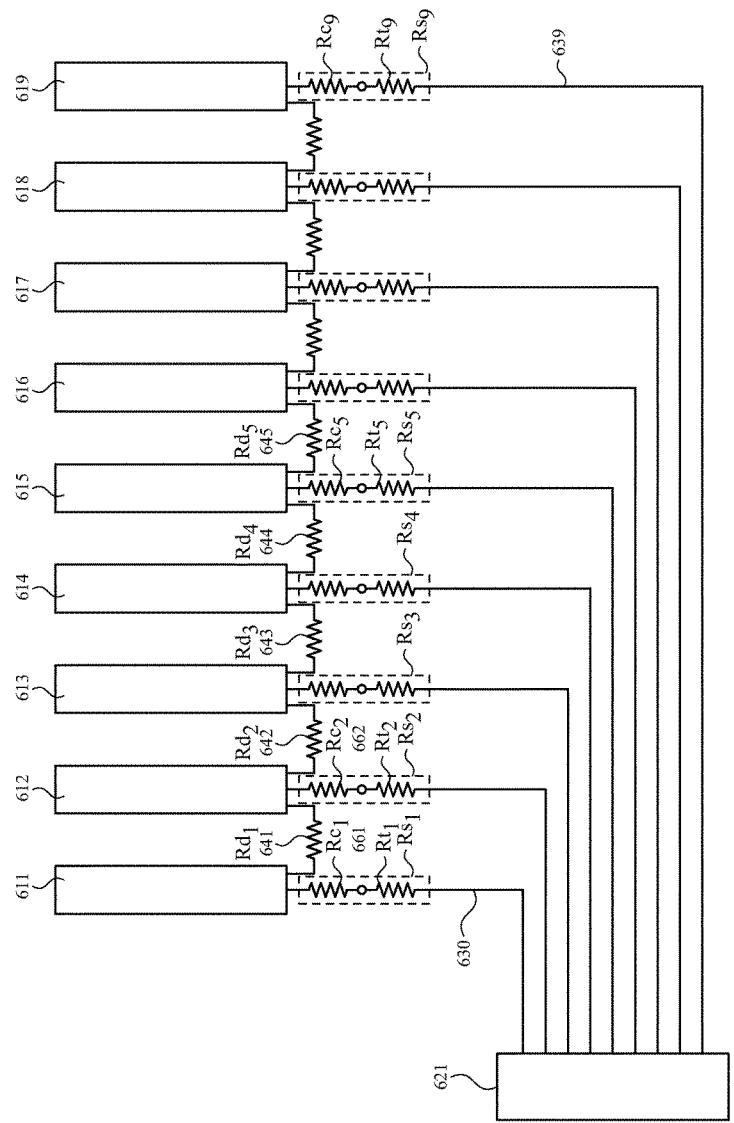
FIG. 6 illustrates an exemplary touch sensor panel system in which sense electrodes are in a signal-diffusing configuration according to examples of this disclosure.

FIG. 6 illustrates a simplified diagram of an exemplary touch sensor panel system 600 including a plurality of electrodes 611-619, touch sensing circuitry 621, and a plurality of conductive traces 630 coupling electrodes to the touch sensing circuitry 621. Electrodes can correspond, for example, to electrodes in a row electrode 201 or column electrode 202 as shown in FIG. 2A. In some examples, a plurality of diffusing resistors can be coupled between one or more electrodes in a signal-diffusing configuration. For example, in FIG. 6, diffusing resistor 641 can be coupled between electrodes 611 and 612. In some examples, series resistances Rs (represented conceptually as boxes with dashed lines) can be coupled between one or more electrodes and touch sensing circuitry 621. Each of the series resistances Rs can represent one of a plurality of compensating resistances Rc (corresponding to resistors 661-669) and one of a plurality of trace resistances Rt. Touch sensing circuitry 621 can perform touch position estimation based on the signals detected by one or more of the plurality of sense electrodes, as discussed above with reference to FIG. 2A. For ease of description, only nine electrodes 611-619 and corresponding components are shown, however, it is understood that the scope of this disclosure includes touch sensor panels with more than nine sense electrodes as well as other supporting circuitry not shown in FIG. 6. It should be noted that although the examples of this disclosure focus on diffusing resistors, other diffusing configurations are contemplated within the scope of this disclosure, which can include, for example components such as inductors, capacitors, additional resistors, etc. Moreover, in some cases, components within diffusing configurations can be coupled to switches to control their function. In some examples, resistances such as diffusion resistors and/or series resistances may comprise resistances inherent to circuit components (e.g., not discrete or intentional resistors).

Figure 7:
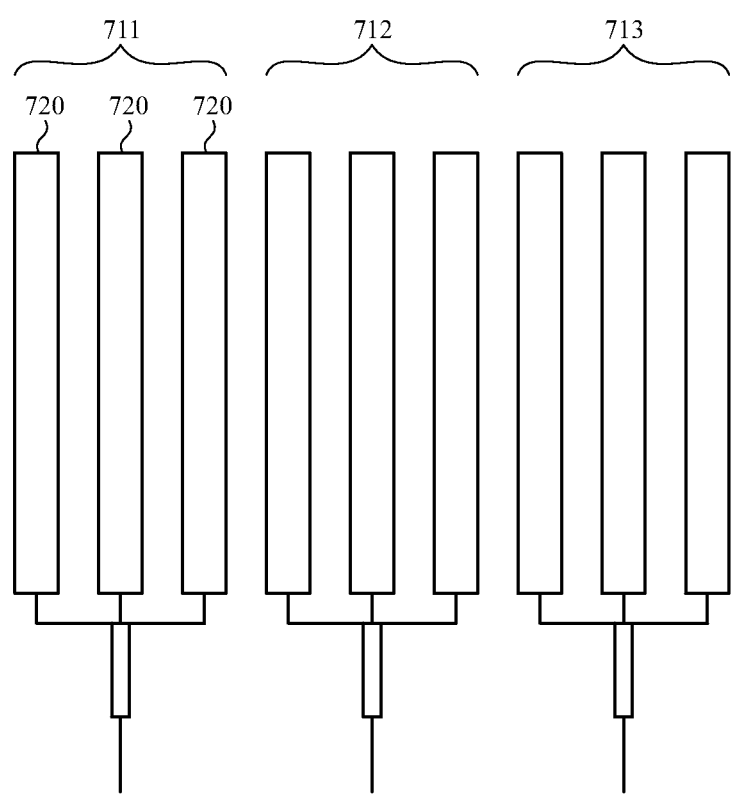
FIG. 7 illustrates an exemplary non-signal-diffusing configuration in which sense electrodes are electrically isolated according to examples of the disclosure.

In some examples, electrodes 611-619 can be composite electrodes, including a plurality of component electrodes (e.g., prongs) extending along the length of the sense electrode. FIG. 7 illustrates an exemplary non-diffusing electrode configuration, in which each composite electrode 711-713 is configured to be electrically isolated from one another. Composite electrodes 711-713 can each include a plurality of prongs 720. Composite electrodes 711-713 shown in FIG. 7 each include three prongs, though other examples may have more or fewer prongs than the electrodes shown in FIG. 7. The signal profile of the configuration of FIG. 7 is discussed in detail with reference to FIG. 9A below.

Figure 8A:
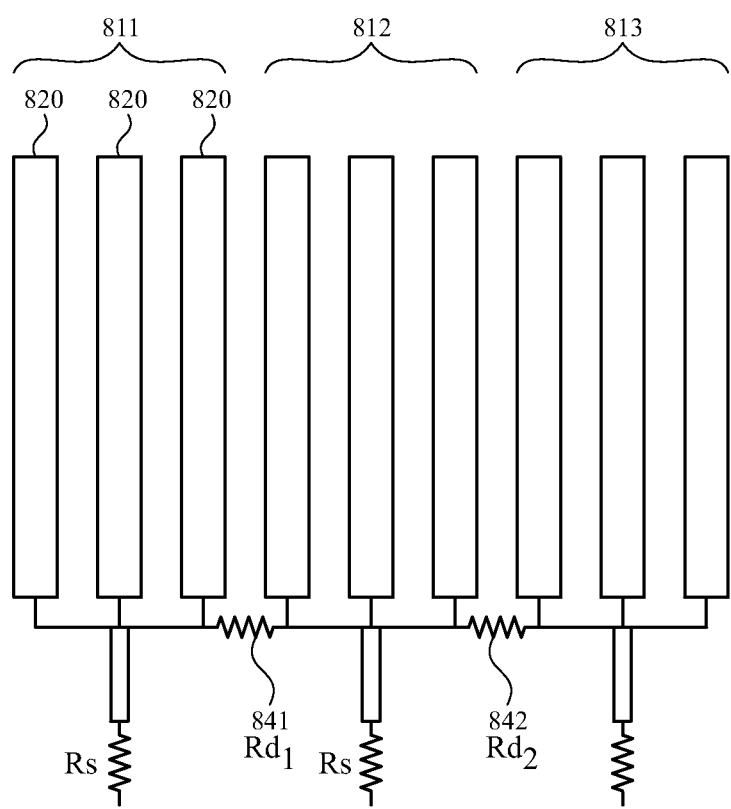
FIG. 8A-8D illustrate exemplary signal-diffusing configurations in which sense electrodes are coupled together via diffusing resistors according to examples of this disclosure.
Figure 8B:
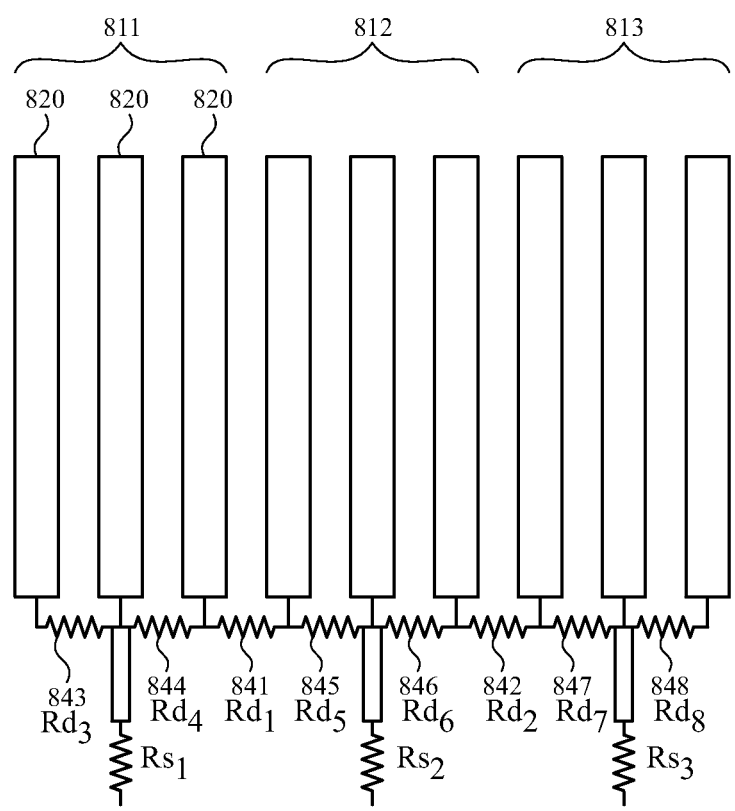

As explained above with reference to FIGS. 5A and 5B, it can be beneficial to diffuse the signal detected on a sense electrode to adjacent electrodes such that the signal profile associated with the electrode is spread, and thus more linear. This spreading of signal profile can correlate to lower wobble error associated with the touch sensor panel. FIGS. 8A-8D illustrate four exemplary diffused electrode configurations which spread the signal profile associated with each electrode to be wider, and thus, more linear. The signal profiles for each of the electrode configurations in FIGS. 8A-8B are discussed in more detail with reference to FIG. 9B below.

FIG. 8A illustrates example sense electrodes in an exemplary signal-diffusing configuration, in which each of the composite electrodes 811-813 is coupled to an adjacent electrode via one of a plurality of diffusing resistors 841-842. The values and operation of diffusing resistors 841-842 will be discussed in more detail with reference to FIGS. 9A-9B below, though it should be noted that not every electrode may be coupled to an adjacent electrode in some examples. Like the electrode configuration illustrated in FIG. 7, the electrodes shown in FIG. 8A can each include three prongs 820, though more or less prongs may be present in other configurations. As shown, each prong 820 within a single electrode can be directly coupled to an adjacent prong. Each composite electrode 811-813 can have a corresponding series resistance Rs. Series resistance Rs can be analogous to the series resistance Rs discussed with reference to FIG. 6, and may include a trace resistance Rt and a compensating resistance Rc. For purposes of this discussion, series resistances Rs associated with each electrode 811-813 are assumed to be equal. The values and operation of series resistances Rs, including trace resistance Rt and compensating resistance Rc, will be discussed in more detail below.

FIG. 8B illustrates another example signal-diffusing electrode configuration Like the configuration illustrated in FIG. 8A, each of the composite electrodes 811-813 can comprise a plurality of prongs 820, and each composite electrode 811-813 can be coupled to adjacent composite electrodes via a diffusing resistor 841 or 842. Additionally, analogous to FIG. 8A, each composite electrode 811-813 can be associated with a series resistance Rs. Unlike FIG. 8A, however, additional diffusing resistors 843-848 can couple one or more prongs 820 to adjacent prongs. In the example illustrated in FIG. 8B, each of the prongs 820 within composite electrodes can be coupled via diffusing resistor 843-848 to an adjacent prong, however, in other examples, some adjacent prongs may be coupled directly. Only three composite sense electrodes are shown in FIGS. 8A-8B, but it is understood that composite sense electrodes can extend in a repeated pattern along a length of a touch sensor panel. In other configurations (not shown), a touch sensor panel may comprise other configurations including, but not limited to, composite sense electrodes having a single prong and composite sense electrodes having multiple sets of prongs extending in different directions. Moreover, the exemplary electrode configurations shown in FIG. 8A-8B relate to sense electrodes in a mutual capacitance system, however, the scope of this disclosure should be understood to include touch sensor panels with other electrode types, including, but not limited to, drive electrodes in a mutual-capacitance system and self-capacitance electrodes in a self-capacitance system.

Figure 8C:
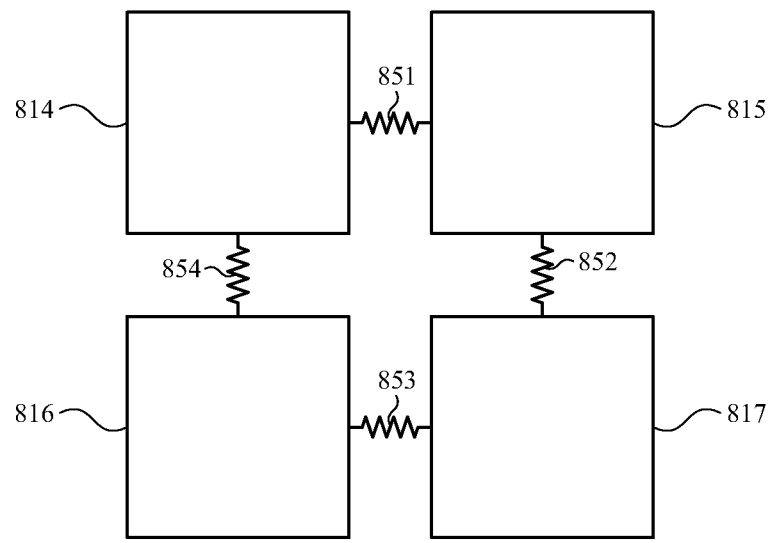
Figure 8D:
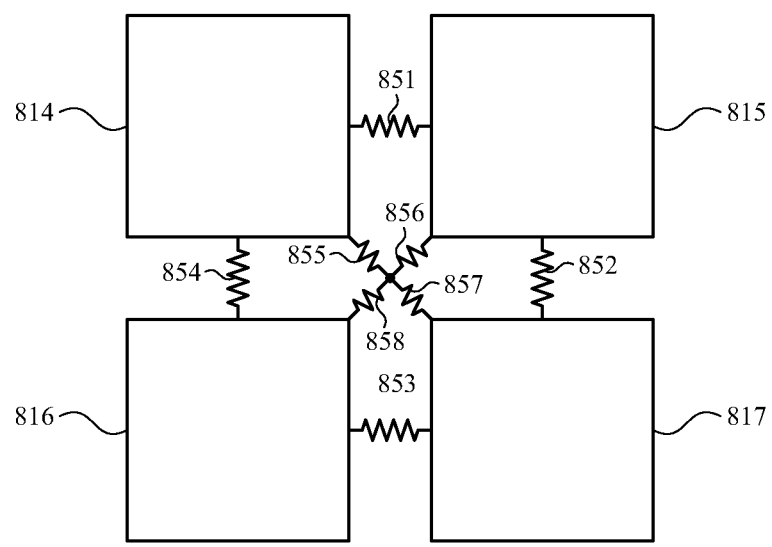

In some examples, signal can be diffused among sense electrodes in two or more directions. FIG. 8C-8D illustrate example signal-diffusing electrode configurations in which sensor electrodes are arranged in a two-dimensional array (e.g., in a pixelated self-capacitance touch screen). In some examples each sense electrode can be electrically isolated from the other sense electrodes and configured to represent a particular x-y location on the panel.

FIG. 8C illustrates a configuration in which each of the sensor electrodes 814-817 can be coupled to two or more adjacent electrodes via diffusing resistors 851-854. In the configuration shown, signal can be diffused in two directions (e.g., in an x-direction and a y-direction). Thus, just as the signal profile can be adjusted in a first direction, the signal profile associated with sense electrodes 814-816 can be adjusted in two directions. FIG. 8D illustrates a configuration in which each of the sensor electrodes 814-816 can be coupled to two or more adjacent electrodes via diffusing resistors 851-858. Like in FIG. 8C, signal can be diffused in at least two directions (e.g., an x-direction and a y-direction) via diffusing resistors 851-854. However, additional diffusing resistors 855-858 coupled between diagonally adjacent sense electrodes can also diffuse signal radially. Thus, in these examples, the signal profile associated with an electrode can be adjusted radially. This can beneficial, for example, in configurations in which each of the sense electrodes is sensed simultaneously. Though not shown, each of the electrodes 814-818 in FIGS. 8C-8D can have an associated sense resistance Rs, which can be coupled to a conductive trace routed to touch sensing circuitry.

Only four sense electrodes are shown in FIG. 8C, but it is understood that composite sense electrodes can extend in a repeated pattern along a length of a touch sensor panel in two dimensions. In other configurations, sense electrodes like those in FIG. 8C may be coupled via diffusing resistors only to sense electrodes adjacent in one direction, similar to the configurations show in FIGS. 8A-8B. The electrode coupling configurations are not limited to the resistors as shown, but can include other diffusing configurations, which can include, for example components such as inductors, capacitors, switches, additional resistors, etc. Moreover, while the sense electrodes of FIG. 8C-8D are shown as rectangular or square regions, it is understood that the sense electrodes are not limited to the shapes, orientations, and positions shown, but can include any suitable configurations according to examples of the disclosure.

The signal-diffusing configurations shown in FIGS. 8A-8D can spread a signal (e.g., capacitance) received on an electrode to adjacent electrodes, resulting in a more linear signal profile. This process is explained in detail below with reference to FIGS. 9A-9B. For simplicity, the examples that follow focus on one-dimensional diffusing (e.g., configurations like those shown in FIGS. 8A-8B), however, it should be understood that the same principles that apply to one-dimensional diffusing can be similarly applied to two-dimensional diffusing (e.g., configurations like those shown in FIG. 8C-8D).

Figure 9A:
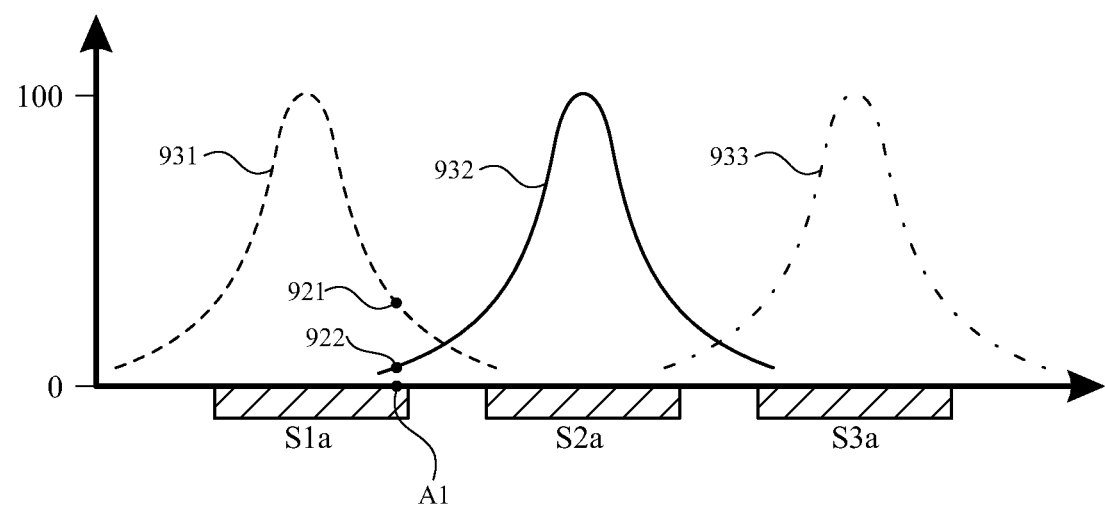
FIGS. 9A and 9B illustrate various signal profiles corresponding to electrodes in a non-signal-diffusing configuration, and various signal profiles corresponding to electrodes in signal-diffusing configuration according to examples of the disclosure.
Figure 9B:
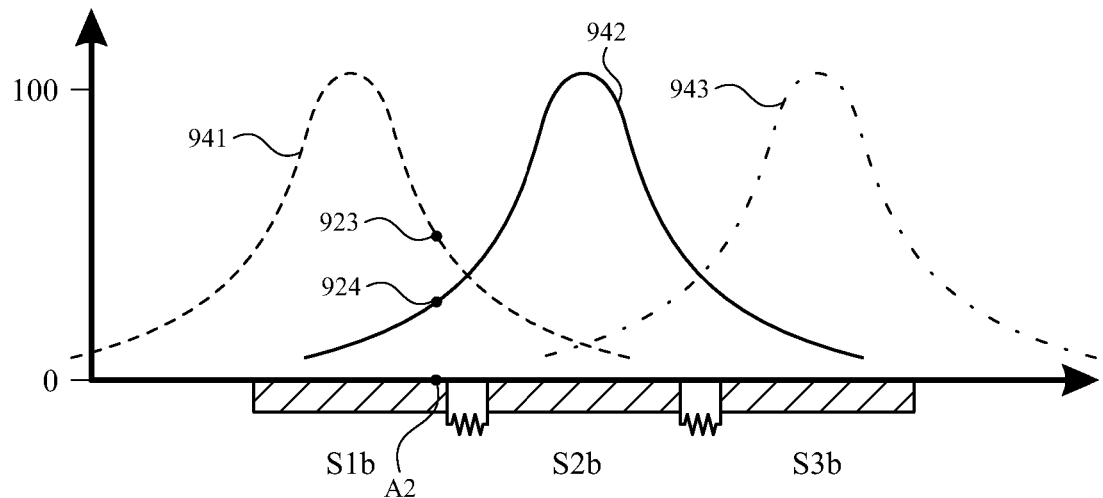

FIGS. 9A-9B compare example signal profiles between a stylus and electrodes in a non-signal-diffusing configuration to example signal profiles between a stylus and electrodes in a signal-diffusing configuration. FIG. 9A illustrates example signal profiles for three sense electrodes S1a, S2a, and S3a in a non-signal-diffusing configuration (e.g., the configuration shown in FIG. 7). FIG. 9B illustrates example signal profiles for three sense electrodes S1b, S2b, and S3b in a signal-diffusing configuration (e.g., one of the configurations shown in FIGS. 8A-8B). The x-axes of the graphs in both FIGS. 9A-9B represent the position of an object (e.g., a stylus) along an x-direction of a touch sensor panel, and the y-axes represent the normalized signal amplitude detected at the respective electrode at each point along the x-axis, as similarly described above with reference to FIGS. 4A and 4B. For reference, the positions of example electrodes are represented as rectangles under the x-axis in both FIGS. 9A and 9B. In FIG. 9B, resistor symbols are included between each electrode in the signal-diffusing configuration to indicate that electrodes can be coupled together via a diffusing resistor (e.g., a diffusing resistor in FIGS. 8A-8B). For the purposes of this description, example stylus positions A1 and A2, are respectively marked in FIGS. 9A and 9B, as will be described below. For ease of comparison, each of the example electrodes corresponding to the signal profiles in FIGS. 9A-9B is assumed to have the same width and pitch. It should be noted that the signal profiles shown in FIGS. 9A-9B are presented only as examples to illustrate the difference in signal profile between electrode configurations, and should not be understood to represent precise values or scale.

FIG. 9A illustrates an example of three signal profiles 931, 932, and 933 corresponding to three adjacent example sense electrodes S1a, S2a, and S3a in an exemplary non-signal-diffusing configuration (e.g., the configuration illustrated in FIG. 7). Each signal profile is illustrated using a different line pattern. The sense electrodes S1a, S2a, and S3a can be analogous, for example, to sense electrodes 711, 712, and 713 in the configuration FIG. 7. Because each electrode can be electrically isolated, the signal profile for each electrode can be narrower than signal profiles corresponding to a signal-diffusing configuration (e.g., the signal profiles illustrated in FIG. 9B). For example, referring to FIG. 9A, a stylus can be positioned at a position A1 along the x-axis, over electrode S1a and near electrode S2a. In this example, electrode S1a can detect a high amplitude signal (shown as point 921) correlating to signal coupling between the stylus and electrode S1a. However, electrode S2a (which can be electrically isolated from electrode S1a) can detect a significantly smaller amplitude signal (shown as point 922) correlating to a comparatively small signal coupling between the stylus and electrode S2a.

FIG. 9B illustrates an example of three signal profiles 941, 942, and 943 corresponding to three adjacent example sense electrodes S1b, S2b, S3b in an exemplary signal-diffusing configuration (e.g., the configuration illustrated in FIG. 8B). Each signal profile is illustrated using a different line pattern. As discussed above, electrodes in a signal-diffusing configuration can be associated with signal profiles that are more spread, and consequently, more linear, than signal profiles corresponding to a non-diffusing configuration. For example, referring to FIG. 9B, a stylus can be positioned at a position A2 along the x-axis, which is over electrode S1b and near electrode S2b. In this case, electrode S1b can detect a relatively high signal amplitude (shown as point 923) correlating to the signal coupled from the stylus to electrode S1b. However, a small amount of the signal coupled between the stylus and electrode S2b is diffused to adjacent electrodes S1b and S3b via diffusing resistors. As a result, the signal profile for adjacent electrode S1b at position A2 can correlate not only to the coupling between the stylus an electrode S1b, but also the diffused portion of the signal coupled between the stylus and electrode S2b. Thus, more signal can spread from a center electrode to an adjacent electrode in the signal-diffusing configuration. This spreading can make the signal profile of each electrode wider, and thus, more linear in the signal-diffusing configuration.

As discussed above with respect to FIGS. 5A and 5B, the signal profile between a stylus and an electrode can correlate to the wobble error of the associated touch sensor panel. In ideal conditions, the spread of the signal profile can be determined solely by the values of the diffusing resistors Rd in the associated electrode configuration. For example, in the signal-diffusing configuration shown in FIG. 6, the spread of the signal profile associated with sense electrode 613 would ideally be determined primarily by the values $Rd_2$ and $Rd_3$ of diffusing resistors 642 and 643. In reality, however, the spread of the signal profile is determined not only by the values of diffusing resistance Rd, but also by other constraints, such as the series resistance Rs and the bandwidth of the touch sensor panel. For example, referring again to FIG. 6, electrodes 611-619 can each have corresponding series resistances Rs, which can include the trace resistance Rt of corresponding circuit traces. Series resistance Rs can, in some configurations, control the amount of signal charge diffused through each diffusing resistor. In some configurations, the impact of Rs on charge distribution can be minimized by selecting an Rd value much higher than Rs, however, these configurations can lower the bandwidth of the touch sensor panel. Accordingly, in some configurations, an acceptable signal profile can be determined by selecting optimal values for Rd and Rs, while maintaining a desired bandwidth of the touch panel. The relationship between Rd, Rs, and signal profile is discussed in detail with reference to FIGS. 10A-10B below.

Figure 10A:
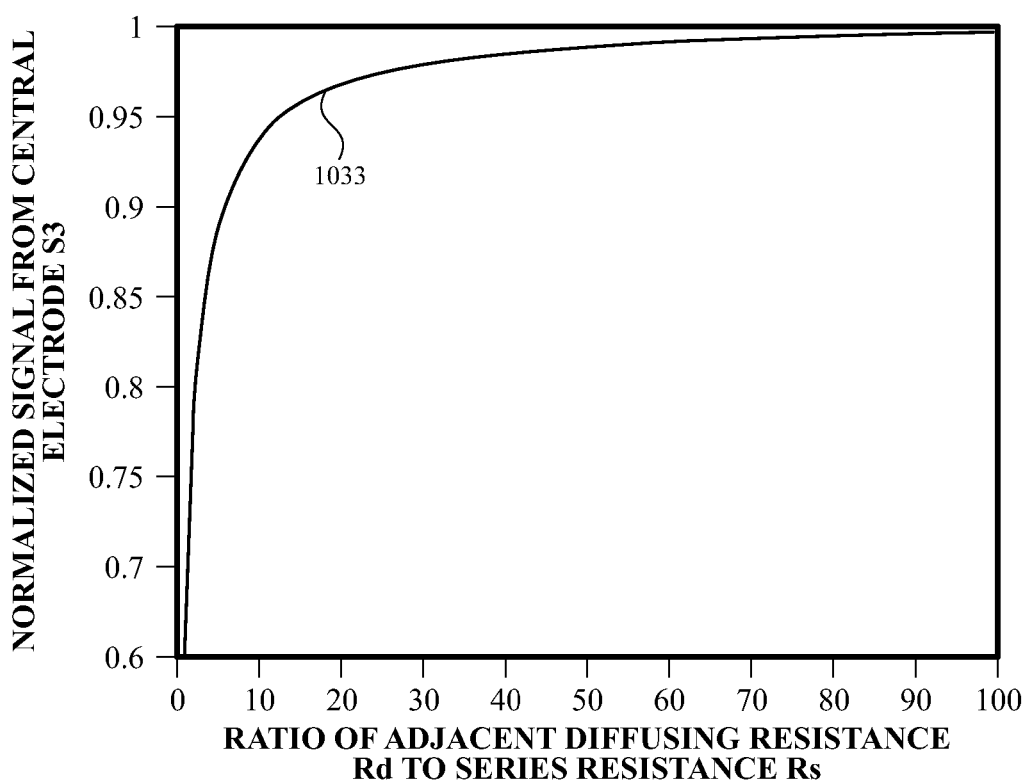
FIGS. 10A and 10B illustrate the impact of series resistance and diffusing resistance on distribution of a signal according to examples of the disclosure.

In some examples, the signal profile for an electrode can be determined by a ratio Rd:Rs between diffusing resistance Rd and serial resistance Rs. In some configurations, the optimal Rd:Rs ratio can be selected based on the amount of signal distributed to a central electrode (that is, an electrode between two adjacent electrodes). FIG. 10A illustrates the impact of diffusing resistance Rd and series resistance Rs on signal distribution 1033 of a hypothetical central electrode S3 in a touch sensor panel system. In this example, the central electrode S3 can correspond to the central sense electrode 613 shown in FIG. 6, and the Rd and Rs values can respectively represent the values $Rd_2$ and $Rd_3$ of diffusing resistors 642 and 643, and series resistance $Rs_3$ shown in FIG. 6. For the purposes of this discussion, each diffusing resistor value Rd in a given configuration is assumed to be equal, though this need not be the case in other examples.

Figure 10B:
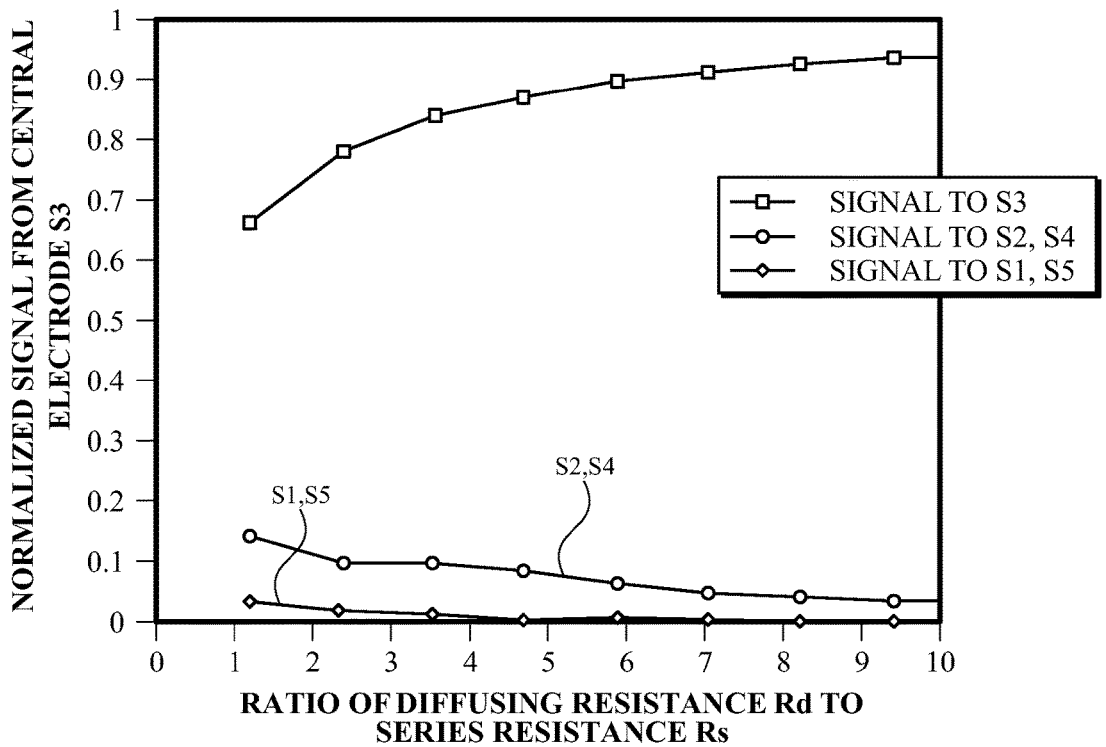

The x-axis of FIG. 10A represents different ratios Rd:Rs (diffusing resistance to series resistance). The y-axis of FIG. 10A represents a percentage of a signal detected by the central electrode S3 relative to the signal detected by all electrodes when a stylus is positioned over the central electrode. As shown in FIG. 10A, as the ratio Rd:Rs increases between 1:1 and 10:1, the signal percentage detected by the central electrode S3 increases sharply. Applying this relationship to the example configuration shown in FIG. 6, when the ratio Rd:Rs is very low, a large portion of the signal received on the central electrode 613 can be diffused to adjacent electrodes 612 and 614 (via diffusing resistors 642 and 643 having low resistances $Rd_2$ and $Rd_3$) and a very small portion of the signal received on the central electrode 613 can be sent to the touch sensing circuitry 621 for detection (via high-resistance series resistance $Rs_3$). Conversely, as the ratio Rd:Rs nears 10:1, a smaller portion of the signal received on the central electrode 613 can be diffused to adjacent electrodes 612 and 614 (via higher-resistance diffusing electrodes $Rd_2$ and $Rd_3$) and a larger portion of the signal received on the central electrode 613 can be sent to the touch circuitry for detection (via lower-resistance series resistance $Rs_3$). In some examples, the optimal ratio Rd:Rs can correspond to a ratio wherein a significant amount of signal (e.g., 10% or more) is distributed outside of central electrode S3 (e.g., central electrode S3 detects 90% or less of signal). As shown in FIG. 10B, a significant amount of signal is distributed outside of central electrode S3 at any Rd:Rs ratio between 1:1 and 8:1. Accordingly, in some examples, the optimal ratio Rd:Rs can be selected to be between 1:1 and 8:1 in order to diffuse signals between electrodes, and thus, reduce the wobble error of a touch screen.

In some examples, the optimal Rd:Rs ratio can be selected based on the amount of signal detected at five or more adjacent electrodes, including a central electrode. FIG. 10B illustrates an expanded view of the signal distribution plot of FIG. 10A between the Rd:Rs ratios 1:1 and 10:1. In addition to illustrating the signal distribution to central electrode S3, FIG. 10B also illustrates the signal distribution to four additional hypothetical electrodes, S1, S2, S4, and S5 which can respectively correspond to electrodes 611, 612, 614, and 615 illustrated in FIG. 6. In this example configuration, electrode S4 is an adjacent electrode to the right of central electrode S3, S5 is a next adjacent electrode to the right of S4, S2 is an adjacent electrode to the left of central electrode S3, and S1 is a next adjacent electrode to the left of S2. Additionally, in this example, Rd and Rs values can respectively correspond to the values $Rd_1$-$Rd_5$ of diffusing resistors 641-645 and series resistances $Rs_1$-$Rs_5$ shown in FIG. 6. For the purposes of this example, each diffusing resistance Rd in a given configuration is assumed to be equal. Likewise, each series resistance Rs in a given configuration is assumed to be equal. Like in FIG. 10A, the x-axis of FIG. 10B represents different ratios Rd:Rs. The y-axis of FIG. 10B represents the percentage of signal detected by each of five adjacent electrodes S1-S5 relative to the signal detected by all electrodes as a stylus is positioned over the central electrode S3. Because electrodes S2 and S4 are symmetric about the central electrode S3, at any given ratio Rd:Rs, electrodes S2 and S4 will detect an equal distribution of signal, and electrodes S1 and S5 will likewise detect an equal distribution of signal. Accordingly, it should be noted that, in this example, the signal distribution plots for S2 and S4 are identical, as are the plots for S1 and S5, though the scope of this disclosure is not so limited.

As shown in FIG. 10B, as the ratio Rd:Rs increases, more signal is distributed to central electrode S3, and less signal is distributed to adjacent electrodes S1, S2, S4, and S5. In some configurations, an optimal Rd:Rs ratio can correspond to a signal distribution wherein a significant amount of signal (e.g., 10% or more) is collectively distributed to adjacent electrodes S2 and S4, while a very small amount of signal (e.g., 2% or less) is collectively distributed to electrodes S1 and S5, which are the next adjacent electrodes beyond S2 and S4. As shown in FIG. 10B, a significant amount of signal is distributed to adjacent electrodes S2 and S4 at any ratio between 1:1 and 8:1 (e.g., at ratio 1:1, S2 and S4 each receive approximately 15% of signal; at ratio 8:1, S2 and S4 each receive approximately 5% of signal). However, electrodes S1 and S5 only receive a very small amount of signal at ratios above 3:1 (e.g., at 3:1 electrodes S1 and S5 each receive approximately 0.07% of signal). Accordingly, in these examples, in order to achieve an acceptable signal profile, the optimal ratio Rd:Rs can be selected to be between 3:1 and 8:1. In other configurations, an optimal Rd:Rs ratio can correspond to a signal distribution wherein the maximum amount of signal is distributed to adjacent electrodes S2 and S4, while a very small amount of signal is distributed to electrodes S1 and S5. In these configurations, the optimal ratio can be more narrowly selected to be between 3:1 and 5:1.

The scope of this disclosure is not limited to configurations wherein diffusing resistances Rd are equal for each electrode. In some examples, the signal profile between a stylus and an electrode can be widened or narrowed in specific regions by selecting different values for different diffusing resistors. For example, referring to FIG. 8B, diffusing resistors 841-842 coupling composite electrodes 811-813 may have different values $Rd_1$-$Rd_2$ than the values $Rd_3$-$Rd_8$ of diffusing resistors 843-848 coupling electrode prongs 820. Moreover, diffusing resistors in one region of a touch panel may have a different value than diffusing resistors in another region of a touch panel.

The function of compensating resistors having a compensating resistance Rc will now be described. Referring back to FIG. 6, in some examples, each electrode 611-619 can be associated with a series resistance Rs, which can represent the total resistance between electrodes 611-619 and touch sensing circuitry 621. Specifically, series resistance Rs can include a trace resistance Rt and a compensating resistance Rc (corresponding to compensating resistors 661-669). For ease of description, the term "trace resistance" is used herein to describe the resistance between touch sensing circuitry 621 and a compensating resistor 661-669, however, it should be understood that trace resistance Rt can include resistance not strictly associated with the conductive trace itself (e.g., other parasitic resistance). In some examples, trace resistance Rt can vary from electrode to electrode. For example, trace resistance $Rt_1$ associated with electrode 611 nearest to the touch sensing circuitry 621 can be lower than trace resistance $Rt_9$ associated with electrode 619 further from the touch sensing circuitry 621. Because trace resistance Rt can vary from electrode to electrode, if not compensated, the series resistance Rs of each electrode can also vary. In some cases, this potential mismatch in series resistance Rs between electrodes can result in higher wobble error in the touch sensor panel.

In some examples, series resistance Rs at each electrode can be made substantially equal using compensating resistors. For example, referring again to FIG. 6, each electrode can be associated with a series resistance Rs including a trace resistance Rt and a compensating resistance Rc. In some examples, the compensating resistance Rc can be selected such that the sum of the compensating resistance Rc and trace resistance Rt substantially matches an optimal series resistance, $Rs_{OPT}$. In examples where series resistance Rs comprises only a trace resistance Rt and compensating resistance Rc (e.g., Rs=Rt+Rc), a compensating resistance $Rc_N$ can be selected for each electrode N according to the following formula:

$$Rc_N = Rs_{OPT} - Rt_N \qquad (2)$$

In some cases, the optimal series resistance $Rs_{OPT}$ can correspond to a maximum trace resistance $Rt_{MAX}$ among a set of electrodes, such that:

$$Rs_{OPT} = Rt_{MAX} \quad (3)$$

In this configuration, applying equations (1) and (2), a compensating resistance $Rc_N$ can be selected for each electrode N according to the following formula:

$$Rc_N = Rt_{MAX} - Rt_N \quad (4)$$

Using the conditions of equations (3) and (4) above, each electrode N can have a compensating resistance $Rc_N$ such that each electrode has a series resistance $Rs_N$ equal to the optimal series resistance $Rs_{OPT}$. This is shown below in the following formula:

$$Rs_N = Rt_N + Rc_N = Rt_N(Rt_{MAX} - Rt_N) = Rt_{MAX} = Rs_{OPT} \quad (5)$$

It should be noted that not all electrodes in a configuration may have an associated compensating resistance Rc. For example, if the trace resistance Rt of an electrode is the maximum trace resistance in the electrode set (that is, the largest trace resistance), then the compensating resistance Rc associated with that electrode can be substantially 0 ohms. As an example, in the configuration of FIG. 6, if the maximum trace resistance $Rt_{MAX}$ is $Rt_9$ corresponding to sense electrode 619, then the compensating resistance $Rc_1$ of electrode 611 can be equal to ($Rt_9$–$Rt_1$), but the compensating resistance $Rt_9$ corresponding to electrode 619 can be substantially equal to 0 ohms. In some cases, an electrode having a series resistance Rs equal to the optimal series resistance $Rs_{OPT}$ may nevertheless have a compensating resistance Rc, for example, when compensating resistance Rc is utilized to compensate something other than series resistance mismatch. For ease of explanation, some electrodes have been described as conceptually having a compensating resistance Rc of 0 ohms, however, it should be understood that some negligible resistance can be present at the coupling between the conductive trace and electrode body by nature of the resistivity of the conductive material.

In the above example, an optimal series resistance $Rs_{OPT}$ can be chosen for a set of electrodes. In some examples, the electrode set can include all of the electrodes connected to a touch circuitry in a touch sensor panel. In other words, each electrode connected to a touch circuitry can have substantially the same series resistance Rs equal to an optimal series resistance $Rs_{OPT}$. In other examples, certain electrodes may have a first optimal series resistance, and other electrodes may have one or more different optimal series resistances. The optimal series resistance $Rs_{OPT}$ associated with an electrode set need not correspond to the maximum trace resistance $Rt_{MAX}$ within the electrode set. For example, an optimal series resistance $Rs_{OPT}$ can be different from the maximum trace resistance $Rt_{MAX}$ in order to better achieve an optimal Rd:Rs ratio as described above with reference to FIG. 10A-10B.

In some examples, the values of diffusing resistors Rd can vary between electrodes. In some of these cases, the compensating resistance Rc can be selected as to correct any mismatch in diffusing resistance Rd. For example, referring back to the configuration in FIG. 8B, diffusing resistors 843-844 of electrode 811 can have a diffusing resistance $Rd_1$, while diffusing resistors 845-846 of electrode 812 can have a second diffusing resistance $Rd_2$. A compensating resistance Rc can be included in one or more of series resistances $Rs_1$ and $Rs_2$, corresponding to electrode 811 and electrode 812 respectively. In this example, compensating resistance Rc can be selected such that the ratio $Rd:Rs_1$ matches the ratio $Rd:Rs_2$, as discussed with reference to FIGS. 10A-10B above.

Figure 10C:
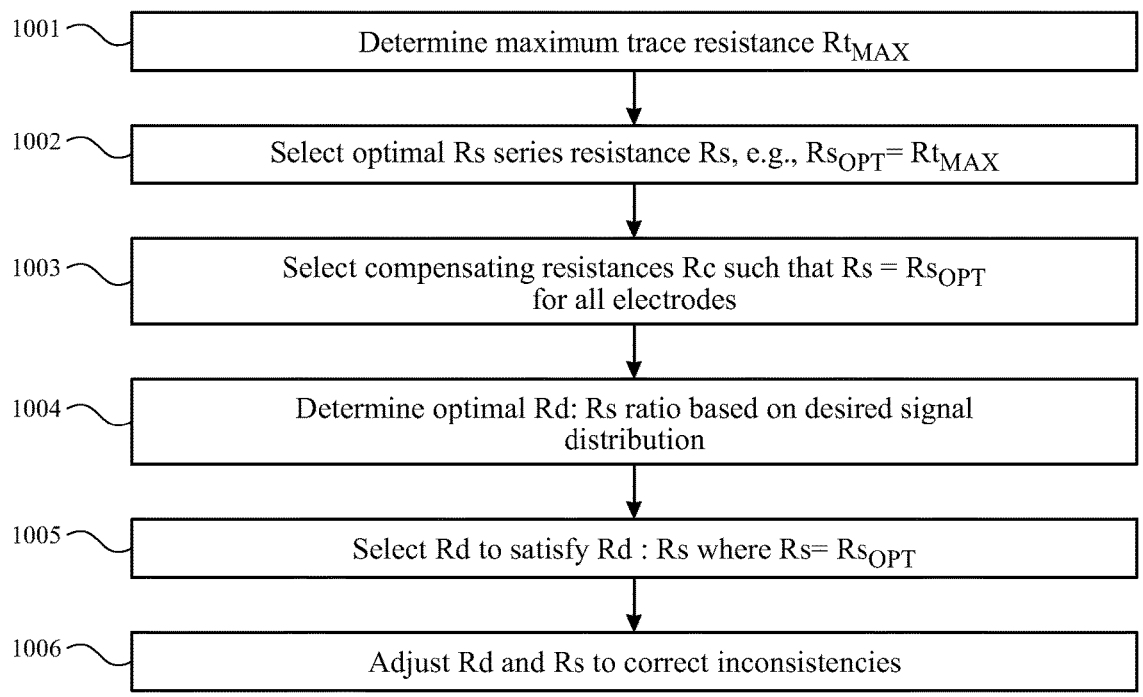
FIG. 10C is a flowchart of a method for selecting resistance values for use in a touch sensor panel according to examples of the disclosure.

In some examples, the resistance values Rs, Rc and Rd associated with a set of electrodes in a signal-diffusing configuration (e.g., the configuration shown in FIG. 6) can be chosen according to a series of steps. FIG. 10C is a flowchart of an exemplary method for selecting resistance values Rs, Rc, and Rd for use in a touch sensor panel. An optimal series resistance $Rs_{OPT}$ can initially be selected based on the characteristics of the configuration; for example, the maximum trace resistance $Rt_{MAX}$ associated with the set of electrodes. Thus, to select the optimal series resistance $Rs_{OPT}$ the maximum trace resistance $Rt_{MAX}$ can first be determined (1001). Second, the optimal series resistance $R_{SOPT}$ can be set (1002), for example, to be equal to $Rt_{MAX}$. Third, respective compensating resistances Rc associated with each electrode in the set can be selected (1003) such that the respective series resistances Rs of each electrode are substantially equal to the selected optimal series resistance $Rs_{OPT}$. In some examples, these first and second steps can be selected in accordance with the equations (2)-(5) set forth above. Fourth, an optimal ratio Rd:Rs can be determined (1004), where Rs is the optimal series resistance $Rs_{OPT}$. In some examples, step 1004 can be performed in accordance with the data discussed with reference to FIGS. 10A-10B above as to achieve an optimal signal profile between a stylus and the electrodes in the set. Fifth the value of diffusing resistors Rd can be selected (1005) to satisfy the optimal ratio Rd:Rs. In some examples, a sixth step can be performed wherein the diffusing resistance Rd and series resistance Rs are adjusted (1006) further as to account for additional constraints, for example, touch sensor panel bandwidth and inconsistencies specific to each individual touch sensor panel. In some examples, respective compensating resistances Rc associated with the set of electrodes can be selected for additional purposes, for example, correcting diffusing resistance Rd mismatch.

Figure 11A:
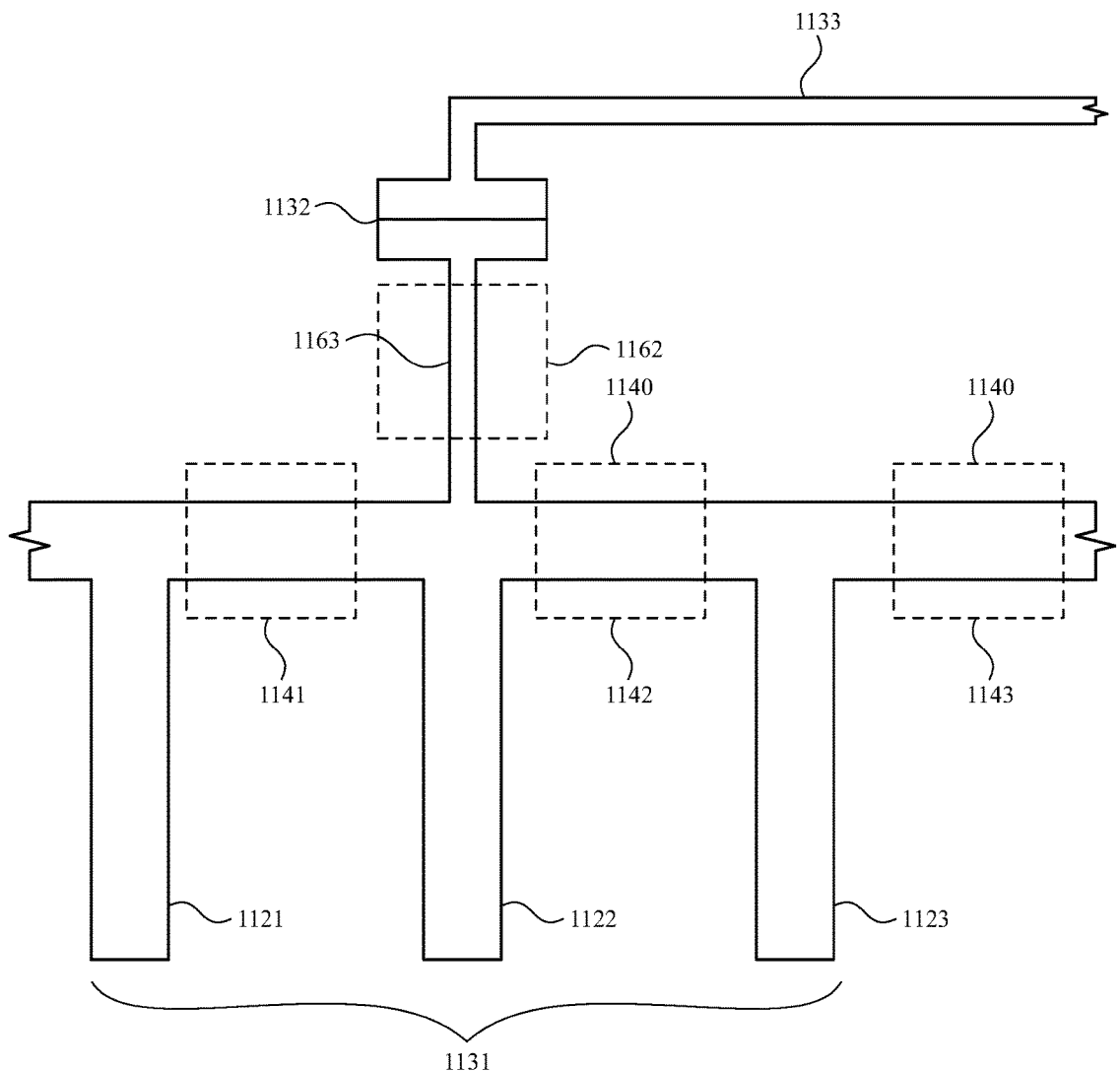
FIGS. 11A and 11B illustrate the details of the structure of a sense electrode in a signal-diffusing configuration according to examples of the disclosure.
Figure 11B:
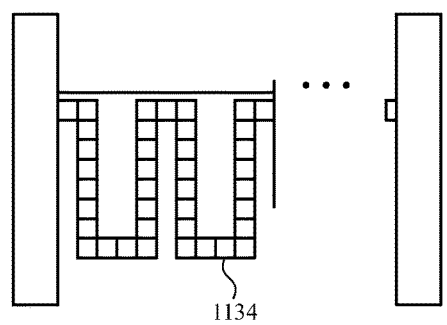

Details of the structure of an example electrode in a signal-diffusing configuration will now be discussed with reference to FIGS. 11A-11B below. FIGS. 11A-11B illustrate a sense electrode 1131 analogous to a sense electrode 812 in the configuration shown in FIG. 8B. Electrode 1131 can comprise three prongs 1121-1123, each coupled to an adjacent prong via diffusing resistors 1142-1143, and electrode 1131 can be coupled to adjacent electrodes (not shown) via a diffusing resistors 1141 and 1144. Each diffusing resistor 1140 can have a diffusing resistance Rd. In some examples, a compensating resistor 1162 having a compensating resistance Rc can be formed between a body of the electrode 1131 and a coupling point 1132 to a conductive trace 1133.

In some examples, compensating resistor 1162 can be formed of a segment of conductive material coupled between the electrode body 1131 and the coupling point 1132 to the conductive trace 1133. The compensating resistance Rc of the compensating resistor 1162 can be determined by the width and length of the segment of conductive material 1163 forming the compensating resistor 1162. Specifically, a narrow segment of conductive material 1163 can form a high compensating resistance Rc, while a wide segment of conductive material 1163 can form a low compensating resistance Rc. One skilled in the art would understand that resistance equations can be used to select a specific length, width, and thickness of the segment of conductive material 1163 as well as select conductive materials with specific conductivity in order to produce a desired compensating resistance Rc.

In some cases the conductive trace 1133 and the segment 1163 forming compensating resistor 1162 can be formed of the same conductive material. In other cases, the segment of conductive material 1163 forming the compensating resistor 1162 can have a conductivity different (e.g., less) than the conductive material forming the conductive trace 1133. For example, the conductivity of the conductive material 1163 forming the conductive trace 1133 can be at least 1000 times higher than the conductivity of the material forming the compensating resistor 1162, though the scope of this disclosure is not so limited. By forming the compensating resistor of a low-conductivity material, the width and/or length of the segment forming the compensating resistor can be reduced. This may be advantageous, for example, to minimize signal interference, minimize parasitic capacitance, or simplify wire routing.

As discussed above, in some examples, each electrode can have a different compensating resistance Rc. In FIG. 11A, the conductive material 1163 can be made wider or narrower during the manufacturing of the touch sensor panel in order to form a compensating resistor with the selected compensating resistance Rc. In some examples, a wide segment of conductive material 1163 having a maximum width can be formed in a first manufacturing step and subsequently trimmed to the appropriate width, for example, using a laser etching process. In other configurations, the compensating resistor 1162 may be formed of a variable resistor, which can be tuned to the appropriate compensating resistance Rc. In some examples, the values of compensating resistance Rc can be determined and set after a calibration measurement step.

In some examples, each diffusing resistor 1140 can be formed of a conductive material patterned in a serpentine shape 1134, as shown in FIG. 11B. One skilled in the art would understand that resistance equations can be used to determine a specific length and width of the conductive material pattern 1134 in order to produce a desired diffusing resistance Rd. In some examples, the precise values of diffusing resistance Rd can be determined and set after a calibration measurement step. As discussed above with reference to FIG. 10A-10B, each electrode in a signal-diffusing configuration need not share the same diffusing resistance Rd.

It should be noted that any resistors in any of the example configurations of this disclosure, including compensating resistors and diffusing resistors, can be formed using any of the methods described above. It should also be noted that the configuration illustrated in FIGS. 11A-11B is exemplary only and should not be understood to represent precise values or scale. It should also be understood that, in other examples, circuit elements (e.g., diffusing resistors and/or compensating resistors) need not be formed using conductive trace material, and can be formed using any appropriate means (e.g., discrete components or on-chip components).

FIGS. 12A-12D illustrate example systems in which the signal-diffusing configurations for reducing stylus tip wobble according to examples of the disclosure can be implemented. FIG. 12A illustrates an example mobile telephone 1236 that includes a touch screen 1224 and other computing system blocks that can implement the signal-diffusing configurations for reducing stylus tip wobble according to various examples. FIG. 12B illustrates an example digital media player 1240 that includes a touch screen 1226 and other computing system blocks that can implement the signal-diffusing configurations for reducing stylus tip wobble according to various examples. FIG. 12C illustrates an example personal computer 1244 that includes a touch screen 1228 and other computing system blocks that can implement the signal-diffusing configurations for reducing stylus tip wobble according to various examples. FIG. 12D illustrates an example tablet computing device 1248 that includes a touch screen 1230 and other computing system blocks that can implement the signal-diffusing configurations for reducing stylus tip wobble according to various examples. The touch screen and computing system blocks that can implement the signal-diffusing configurations for reducing stylus tip wobble can be implemented in other devices including in wearable devices.

Thus, the examples of the disclosure provide various signal-diffusing configurations to diffuse signal which may exist on a sense electrode to adjacent sense electrodes, thereby making the signal profile associated with the sense electrode more linear, thus reducing stylus tip wobble and increasing touch sensor panel performance.

Therefore, according to the above, some examples of the disclosure are directed to an apparatus comprising: a touch sensor panel including: a plurality of sense electrodes, including a first sense electrode and a second sense electrode; a plurality of diffusing resistors, including a first diffusing resistor coupled between the first sense electrode and the second sense electrode; sense circuitry coupled to the first and second sense electrodes and configured to detect a touch signal using the first sense electrode and the second sense electrode. Additionally or alternatively to one or more of the examples disclosed above, in some examples, the first sense electrode and second sense electrode of the plurality of sense electrodes are formed on a first layer of a first conductive material; and the first diffusing resistor is formed on the first layer of the first conductive material. Additionally or alternatively to one or more of the examples disclosed above, in some examples, a third sense electrode of the plurality of sense electrodes; a second diffusing resistor coupled between the first sense electrode and the third sense electrode; wherein the second sense electrode is proximate to the first electrode in a first direction, and the third sense electrode is proximate to the first electrode in a second direction different from the first. Additionally or alternatively to one or more of the examples disclosed above, in some examples, the first sense electrode of the plurality of sense electrodes includes a plurality of component electrodes. Additionally or alternatively to one or more of the examples disclosed above, in some examples, a second diffusing resistor of the plurality of diffusing resistors coupled between at least two component electrodes of the plurality of component electrodes of the first sense electrode. Additionally or alternatively to one or more of the examples disclosed above, in some examples, a plurality of conductive traces, including a first conductive trace coupling the first sense electrode to the sense circuitry, and a second conductive trace coupling the second sense electrode to the sense circuitry; and a plurality of compensating resistors, including a first compensating resistor coupled in series with the first conductive trace and a second compensating resistor coupled in series with the second conductive trace. Additionally or alternatively to one or more of the examples disclosed above, in some examples, the first compensating resistor has a first compensating resistance; the second compensating resistor has a second compensating resistance; the first conductive trace has a first conductive trace resistance; the second conductive trace has a second conductive trace resistance; the first sense electrode is associated with a first series resistance including the first compensating resistance and the first conductive trace resistance; and the second sense electrode is associated with a second series resistance including the second compensating resistance and the second conductive trace resistance. Additionally or alternatively to one or more of the examples disclosed above, in some examples, the first compensating resistor is formed of a first segment of conductive material, the first segment of conductive material having a first cross sectional area; and the second compensating resistor is formed of a second segment of conductive material, the second segment of conductive material having a second cross sectional area, different than the first cross sectional area; the first compensating resistance is different than the second compensating resistance. Additionally or alternatively to one or more of the examples disclosed above, in some examples, the conductive material forming the first segment is a different conductive material than a conductive material forming the first conductive trace. Additionally or alternatively to one or more of the examples disclosed above, in some examples, the conductive material forming the first segment has a lower conductivity than a conductivity of the conductive material forming the first conductive trace. Additionally or alternatively to one or more of the examples disclosed above, in some examples, the conductive material forming the first segment has a conductivity at least 1000 lower than a conductivity of the conductive material forming the first conductive trace. Additionally or alternatively to one or more of the examples disclosed above, in some examples, the first segment of conductive material is formed by removing portions of a first larger segment of conductive material having a pre-determined cross sectional area; the second segment of conductive material is formed by removing portions of a second larger segment of conductive material having the pre-determined cross sectional area. Additionally or alternatively to one or more of the examples disclosed above, in some examples, the first compensating resistance is selected such that the first series resistance is substantially equal to a common series resistance; and the second compensating resistance is selected such that the second series resistance is substantially equal to the common series resistance. Additionally or alternatively to one or more of the examples disclosed above, in some examples, the common series resistance is substantially equal to a largest conductive trace resistance associated with one of the plurality of conductive traces. Additionally or alternatively to one or more of the examples disclosed above, in some examples, the plurality of diffusing resistors substantially share a diffusing resistance; and the diffusing resistance is selected such that the diffusing resistance and the common series resistance satisfy a threshold ratio between the diffusing resistance and the common series resistance. Additionally or alternatively to one or more of the examples disclosed above, in some examples, the threshold ratio between the diffusing resistance and the common series resistance is greater than 3. Additionally or alternatively to one or more of the examples disclosed above, in some examples, the threshold ratio between the diffusing resistance and the common series resistance is greater than 3 and less than 8. Additionally or alternatively to one or more of the examples disclosed above, in some examples, the threshold ratio between the diffusing resistance and the common series resistance is greater than 3 and less than 5. Additionally or alternatively to one or more of the examples disclosed above, in some examples, the first sense electrode is configured to receive a signal from an object; and the threshold ratio between the diffusing resistance and the common series resistance is selected such that the first sense electrode diffuses a first portion of the signal to the second sense electrode, the first portion having more than 5 percent of the signal. Additionally or alternatively to one or more of the examples disclosed above, in some examples, a third sense electrode is adjacent to the second sense electrode and distal to the first sense electrode; and the threshold ratio between the diffusing resistance and the common series resistance is selected such that the second sense electrode diffuses less than 10 percent of the first portion of the signal to a third sense electrode.

Some examples of the disclosure are directed to a method for detecting an object proximate to a touch sensor panel, the method comprising: detecting, at a first sense electrode, a first portion of a signal originating from a coupling between the first sense electrode and the object; detecting, at a second sense electrode, a second portion of the signal originating from the coupling between the first sense electrode and the object, wherein the second portion of the signal is diffused from the first sense electrode to the second sense electrode; and determining a location of the object from the first and second portions of the signal. Additionally or alternatively to one or more of the examples disclosed above, in some examples, the second portion of the signal contains at least 5 percent of the signal. Additionally or alternatively to one or more of the examples disclosed above, in some examples, the method further comprises detecting, at a third sense electrode, a third portion of the signal originating from the coupling between the first sense electrode and the object, wherein: the third portion of the signal is diffused from the second sense electrode to the third sense electrode through a second diffusing resistor coupled between the second sense electrode and the third sense electrode; and the third portion of the signal contains less than 1 percent of the signal. Additionally or alternatively to one or more of the examples disclosed above, in some examples, the first sense electrode is coupled to a first conductive trace, the first conductive trace having a first conductive trace resistance; the second sense electrode is coupled to a second conductive trace, the second conductive trace having a second conductive trace resistance; the first sense electrode has a first compensating resistor having a compensating resistance and coupled in series with the first conductive trace; the second sense electrode has a second compensating resistor having a compensating resistance and coupled in series with the second conductive trace; the first sense electrode is associated with a first series resistance, the first series resistance including the first conductive trace resistance and the first compensating resistance; and the second sense electrode is associated with a second series resistance, the second series resistance including the second conductive trace resistance and the second compensating resistance. Additionally or alternatively to one or more of the examples disclosed above, in some examples, the method further comprises selecting the first compensating resistance such that the sum of the first conductive trace resistance and the first compensating resistance is substantially equal to a common series resistance, and selecting the second compensating resistance such that the sum of the second conductive trace resistance and the second compensating resistance is substantially equal to the common series resistance. Additionally or alternatively to one or more of the examples disclosed above, in some examples, the method further comprises selecting the common series resistance to be substantially equal to the largest of the first conductive trace resistance and the second conductive trace resistance. Additionally or alternatively to one or more of the examples disclosed above, in some examples, a percentage of signal in the second portion of the signal is determined by a ratio between the diffusing resistance and the common series resistance. Additionally or alternatively to one or more of the examples disclosed above, in some examples, the method further comprises selecting the ratio between the diffusing resistance and the common series resistance such that the percentage of signal in the second portion of the signal is greater than 5 percent; and selecting the diffusing resistance to satisfy the ratio. Additionally or alternatively to one or more of the examples disclosed above, in some examples, the method further comprises selecting the ratio between the diffusing resistance and the common series resistance to be greater than 3 and less than 8; selecting the diffusing resistance to satisfy the ratio. Additionally or alternatively to one or more of the examples disclosed above, in some examples, the method further comprises selecting the ratio between the diffusing resistance and the common series resistance to be greater than 3 and less than 5; and selecting the diffusing resistance to satisfy the ratio.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. An apparatus comprising:
   a touch sensor panel including:
      a plurality of sense electrodes, including a first sense electrode and a second sense electrode;
      a plurality of diffusing resistors, including a first diffusing resistor coupled between the first sense electrode and the second sense electrode;
      a plurality of conductive traces, including a first conductive trace coupling the first sense electrode to the sense circuitry, and a second conductive trace coupling the second sense electrode to the sense circuitry;
      a plurality of compensating resistances, including a first compensating resistance in series with the first conductive trace and a second compensating resistance in series with the second conductive trace; and
   sense circuitry coupled to the first and second sense electrodes and configured to detect a touch signal using the first sense electrode and the second sense electrode,
   wherein:
      a first series resistance associated with the first conductive trace and the first compensating resistor is substantially equal to a common series resistance; and
      a second series resistance associated with the second conductive trace and the second compensating resistor is substantially equal to the common series resistance.

2. The apparatus of claim 1, wherein:
   the first sense electrode and second sense electrode of the plurality of sense electrodes are formed on a first layer of a first conductive material; and
   the first diffusing resistor is formed on the first layer of the first conductive material.

3. The apparatus of claim 1, wherein the touch sensor panel includes:

a third sense electrode of the plurality of sense electrodes;
a second diffusing resistor coupled between the first sense electrode and the third sense electrode; wherein
the second sense electrode is proximate to the first sense electrode in a first direction, and the third sense electrode is proximate to the first sense electrode in a second direction different from the first.

4. The apparatus of claim 1, wherein:
   the first sense electrode of the plurality of sense electrodes includes a plurality of component electrodes.

5. The apparatus of claim 4, wherein the touch sensor panel includes:
   a second diffusing resistor of the plurality of diffusing resistors coupled between at least two component electrodes of the plurality of component electrodes of the first sense electrode.

6. The apparatus of claim 1, wherein:
   the first compensating resistor is formed of a first segment of conductive material, the first segment of conductive material having a first cross sectional area; and
   the second compensating resistor is formed of a second segment of conductive material, the second segment of conductive material having a second cross sectional area, different than the first cross sectional area;
   the first compensating resistance is different than the second compensating resistance.

7. The apparatus of claim 6, wherein:
   the conductive material forming the first segment is a different conductive material than a conductive material forming the first conductive trace.

8. The apparatus of claim 7, wherein:
   the conductive material forming the first segment has a lower conductivity than a conductivity of the conductive material forming the first conductive trace.

9. The apparatus of claim 7, wherein:
   the conductive material forming the first segment has a conductivity at least 1000 times lower than a conductivity of the conductive material forming the first conductive trace.

10. The apparatus of claim 6, wherein:
    the first segment of conductive material is formed by removing portions of a first larger segment of conductive material having a pre-determined cross sectional area;
    the second segment of conductive material is formed by removing portions of a second larger segment of conductive material having the pre-determined cross sectional area.

11. The apparatus of claim 1, wherein:
    the common series resistance is substantially equal to a largest conductive trace resistance associated with one of the plurality of conductive traces.

12. The apparatus of claim 1, wherein:
    the plurality of diffusing resistors substantially share a diffusing resistance; and
    the diffusing resistance is selected such that the diffusing resistance and the common series resistance satisfy a threshold ratio between the diffusing resistance and the common series resistance.

13. The apparatus of claim 12, wherein the threshold ratio between the diffusing resistance and the common series resistance is greater than 3.

14. The apparatus of claim 12, wherein the threshold ratio between the diffusing resistance and the common series resistance is greater than 3 and less than 8.

15. The apparatus of claim 12, wherein the threshold ratio between the diffusing resistance and the common series resistance is greater than 3 and less than 5.

16. The apparatus of claim 12, wherein:
the first sense electrode is configured to receive a signal from an object; and
the threshold ratio between the diffusing resistance and the common series resistance is selected such that the first sense electrode diffuses a first portion of the signal to the second sense electrode, the first portion having more than 5 percent of the signal.

17. The apparatus of claim 16, wherein:
a third sense electrode is adjacent to the second sense electrode and distal to the first sense electrode; and
the threshold ratio between the diffusing resistance and the common series resistance is selected such that the second sense electrode diffuses less than 10 percent of the first portion of the signal to a third sense electrode.

18. A method for detecting an object proximate to a touch sensor panel, the method comprising:
detecting, at a first sense electrode, a first portion of a signal originating from a coupling between the first sense electrode and the object;
detecting, at a second sense electrode, a second portion of the signal originating from the coupling between the first sense electrode and the object, wherein the second portion of the signal is diffused by a diffusing resistance from the first sense electrode to the second sense electrode; and
determining a location of the object from the first and second portions of the signal at sense circuitry,
wherein:
a first conductive trace couples the first sense electrode to the sense circuitry and a second conductive trace couples the second sense electrode to the sense circuitry;
a first compensating resistance in series with the first conductive trace wherein a first series resistance associated with the first conductive trace and the first compensating resistor is substantially equal to a common series resistance;
and a second compensating resistance in series with the second conductive trace wherein a second series resistance associated with the second conductive trace and the second compensating resistor is substantially equal to the common series resistance.

19. The method of claim 18, wherein the second portion of the signal contains at least 5 percent of the signal.

20. The method of claim 19, further comprising:
detecting, at a third sense electrode, a third portion of the signal originating from the coupling between the first sense electrode and the object, wherein:
the third portion of the signal is diffused from the second sense electrode to the third sense electrode through a second diffusing resistor coupled between the second sense electrode and the third sense electrode; and
the third portion of the signal contains less than 1 percent of the signal.

21. The method of claim 18, further comprising:
selecting the common series resistance to be substantially equal to a largest of the first conductive trace resistance and the second conductive trace resistance.

22. The method of claim 18, wherein:
a percentage of signal in the second portion of the signal is determined by a ratio between the diffusing resistance and the common series resistance.

23. The method of claim 22, further comprising:
selecting the ratio between the diffusing resistance and the common series resistance such that the percentage of signal in the second portion of the signal is greater than 5 percent; and
selecting the diffusing resistance to satisfy the ratio.

24. The method of claim 22, further comprising:
selecting the ratio between the diffusing resistance and the common series resistance to be greater than 3 and less than 8;
selecting the diffusing resistance to satisfy the ratio.

25. The method of claim 22, further comprising:
selecting the ratio between the diffusing resistance and the common series resistance to be greater than 3 and less than 5; and
selecting the diffusing resistance to satisfy the ratio.

* * * * *